United States Patent
Tsubouchi

(10) Patent No.: US 8,654,370 B2
(45) Date of Patent: Feb. 18, 2014

(54) IMAGE FORMING APPARATUS, PRINTING SYSTEM AND COMPUTER-READABLE STORAGE MEDIUM WITH ADJUSTABLE IMAGE QUALITY

(75) Inventor: Hiroki Tsubouchi, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 152 days.

(21) Appl. No.: 13/223,388

(22) Filed: Sep. 1, 2011

(65) Prior Publication Data

US 2012/0062928 A1 Mar. 15, 2012

(30) Foreign Application Priority Data

Sep. 13, 2010 (JP) ................................ 2010-204857
Jul. 26, 2011 (JP) ................................ 2011-163440

(51) Int. Cl.
*G06K 15/00* (2006.01)

(52) U.S. Cl.
USPC ........................ 358/1.14; 358/1.13; 358/448

(58) Field of Classification Search
None
See application file for complete search history.

(56) References Cited

U.S. PATENT DOCUMENTS

| 7,583,927 B2 * | 9/2009 | Takahashi et al. ............ 399/395 |
| 7,619,781 B2 * | 11/2009 | Mitamura ..................... 358/3.28 |
| 2003/0215252 A1 * | 11/2003 | Yokobori et al. ............... 399/45 |
| 2005/0219566 A1 * | 10/2005 | Sugita ........................... 358/1.9 |
| 2007/0263242 A1 | 11/2007 | Takahashi |

FOREIGN PATENT DOCUMENTS

| JP | 11-146193 | 5/1999 |
| JP | 2006-053284 | 2/2006 |
| JP | 2006-276473 | 10/2006 |
| JP | 2007-301911 | 11/2007 |
| JP | 2008-102261 | 5/2008 |
| JP | 2009-271139 | 11/2009 |
| JP | 2009271139 A * | 11/2009 |

* cited by examiner

*Primary Examiner* — Tammy Pham
*Assistant Examiner* — Richa Mishra
(74) *Attorney, Agent, or Firm* — IPUSA, PLLC

(57) ABSTRACT

An image forming apparatus accepts input of transfer sheet identification information, forms an image on a transfer sheet based on a control value corresponding to the accepted transfer sheet identification information, and accepts input of a correction value of the control value and stores the correction value in correspondence with the transfer sheet identification information in a storage unit. The image is formed on the transfer sheet based on the control value that is corrected by the correction value when the control value is stored in correspondence with the accepted transfer sheet identification information.

16 Claims, 17 Drawing Sheets

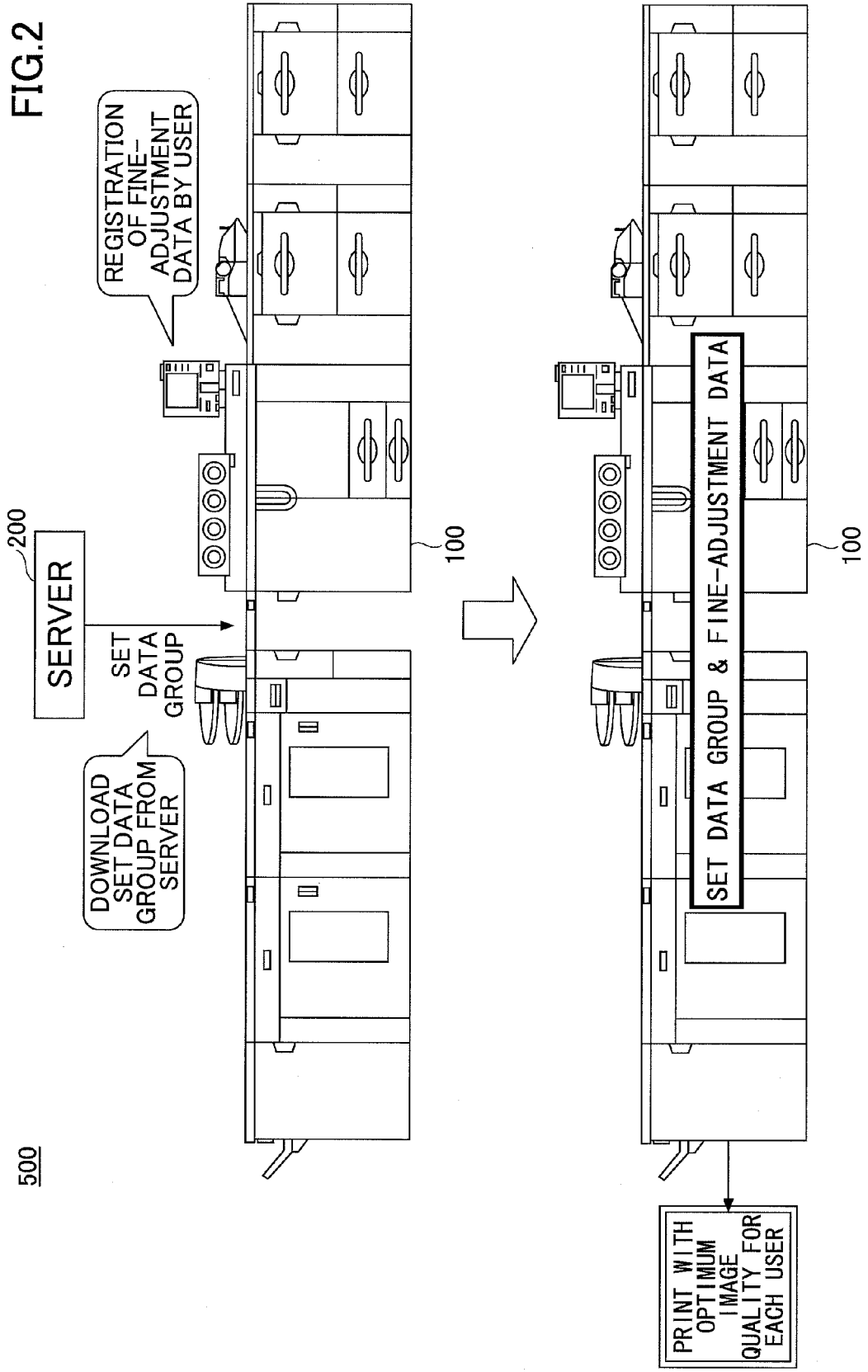

FIG.8

| BRAND OF TRANSFER SHEET | SECONDARY TRANSFER REFERENCE CURRENT | FIXING UNIT TEMPERATURE | LINEAR VELOCITY CORRECTION VALUE | ... |
|---|---|---|---|---|
| TRANSFER SHEET A OF COMPANY CA | 70 | 220 | +5 | ... |
| TRANSFER SHEET B OF COMPANY CA | 65 | 140 | −5 | ... |
| TRANSFER SHEET C OF COMPANY CB | 250 | 155 | +7.5 | ... |
| ... | ... | ... | ... | ... |

SET DATA → (70, 220, +5) = 1 SET DATA GROUP

LIST OF SET DATA GROUPS

FIG.9

| BAND OF TRANSFER SHEET | SET DATA GROUP ||||| FINE-ADJUSTMENT DATA ||||
|---|---|---|---|---|---|---|---|---|---|
| | SECONDARY TRANSFER REFERENCE CURRENT | FIXING UNIT TEMPERATURE | LINEAR VELOCITY CORRECTION VALUE | ... | | IMAGE DENSITY ADJUSTMENT | ABNORMAL IMAGE QUALITY IMPROVEMENT | FIXING STRENGTH ADJUSTMENT | ... |
| TRANSFER SHEET A OF COMPANY CA | 70 | 220 | +5 | ... | | NO FINE-ADJUSTMENT DATA ||| ... |
| TRANSFER SHEET B OF COMPANY CA | 65 | 140 | −5 | ... | | ±0 | −1 | +1 | ... |
| TRANSFER SHEET C OF COMPANY CB | 250 | 155 | +7.5 | ... | | NO FINE-ADJUSTMENT DATA ||| ... |
| ... | ... | ... | ... | ... | | ... | ... | ... | ... |

FIG.10

IMAGE QUALITY FINE-ADJUSTMENT

TRANSFER SHEET A OF COMPANY CA

| | 301 | |
|---|---|---|
| IMAGE DENSITY ADJUSTMENT | 0 | + 302 <br> − 303 |
| ABNORMAL IMAGE QUALITY IMPROVEMENT | −1 | + 302 <br> − 303 |
| FIXING STRENGTH ADJUSTMENT | +1 | + 302 <br> − 303 |
| REGISTRATION ADJUSTMENT (MAIN SCAN) | +0.2 | + 302 <br> − 303 |
| REGISTRATION ADJUSTMENT (SUB SCAN) | −0.3 | + 302 <br> − 303 |

SUBMIT  RETURN

FIG.13

IMAGE QUALITY FINE-ADJUSTMENT

TRANSFER SHEET A OF COMPANY CA

| | 301 | |
|---|---|---|
| IMAGE DENSITY ADJUSTMENT | 0 | + 302 / − 303 |
| ABNORMAL IMAGE QUALITY IMPROVEMENT | −1 | + 302 / − 303 |
| FIXING STRENGTH ADJUSTMENT | +1 | + 302 / − 303 |
| REGISTRATION ADJUSTMENT (MAIN SCAN) | +0.2 | + 302 / − 303 |
| REGISTRATION ADJUSTMENT (SUB SCAN) | −0.3 | + 302 / − 303 |
| BRAND OF TRANSFER SHEET | TRANSFER SHEET A OF COMPANY CA, USER SETTING 1 | 304 |

SUBMIT    RETURN

FIG.14

| BAND OF TRANSFER SHEET | SET DATA GROUP | | | | FINE-ADJUSTMENT DATA | | | |
| --- | --- | --- | --- | --- | --- | --- | --- | --- |
| | SECONDARY TRANSFER REFERENCE CURRENT | FIXING UNIT TEMPERATURE | LINEAR VELOCITY CORRECTION VALUE | ... | IMAGE DENSITY ADJUSTMENT | ABNORMAL IMAGE QUALITY IMPROVEMENT | FIXING STRENGTH ADJUSTMENT | ... |
| TRANSFER SHEET A OF COMPANY CA | 70 | 220 | +5 | ... | NO FINE-ADJUSTMENT DATA | | | ... |
| TRANSFER SHEET B OF COMPANY CA | 65 | 140 | −5 | ... | ±0 | −1 | +1 | ... |
| TRANSFER SHEET C OF COMPANY CB | 250 | 155 | +7.5 | ... | NO FINE-ADJUSTMENT DATA | | | ... |
| TRANSFER SHEET A OF COMPANY CA USER SETTING 1 | 70 | 220 | +5 | ... | −2 | ±0 | +2 | ... |
| ... | ... | ... | ... | ... | ... | ... | ... | ... |

FIG.16

| ID INFO OF IMAGE FORMING APPARATUS | USER SET BAND OF TRANSFER SHEET | BRAND OF TRANSFER SHEET | FINE-ADJUSTMENT DATA | | |
|---|---|---|---|---|---|
| | | | IMAGE DENSITY ADJUSTMENT | ABNORMAL IMAGE QUALITY IMPROVEMENT | FIXING STRENGTH ADJUSTMENT |
| 0001 | USER SET TRANSFER SHEET A | TRANSFER SHEET A OF COMPANY CA | +1 | −1 | +2 |
| 0001 | USER SET TRANSFER SHEET B | TRANSFER SHEET B OF COMPANY CA | ±0 | −1 | +1 |
| 0002 | USER SET TRANSFER SHEET F | TRANSFER SHEET A OF COMPANY CA | +1 | +5 | ±0 |
| 0003 | USER SET TRANSFER SHEET M | TRANSFER SHEET C OF COMPANY CB | −2 | ±0 | +2 |
| ⋮ | ⋮ | ⋮ | ⋮ | ⋮ | ⋮ |

IMAGE FORMING APPARATUS, PRINTING SYSTEM AND COMPUTER-READABLE STORAGE MEDIUM WITH ADJUSTABLE IMAGE QUALITY

CROSS-REFERENCE TO RELATED APPLICATIONS

This application claims the benefit of Japanese Patent Applications No. 2010-204857 filed on Sep. 13, 2010 and No. 2011-163440 filed on Jul. 26, 2011, in the Japanese Patent Office, the disclosures of which are hereby incorporated by reference.

BACKGROUND OF THE INVENTION

1. Field of the Invention

The present invention relates to an image forming apparatus and a printing system that may form images on a recording medium with an adjustable image quality. The present invention also relates to an image adjusting method and a non-transitory computer-readable storage medium that stores a program for causing a computer to form images on the recording medium with the adjustable image quality.

2. Description of the Related Art

An image forming apparatus, such as a printing apparatus, a copying apparatus, a facsimile apparatus, and MFP (Multi-Function Peripheral) that includes functions of at least two of such apparatus, are provided with an image forming function to form images on a sheet-shaped recording medium such as paper (or transfer sheet). The image forming apparatus is popularly used in office environments and the like. Recently, the image forming apparatus is also used in production printing environments, such as commercial printing environments and enterprise printing environments, in place of an offset printing apparatus, because of the flexibility to cope with small lots and the ability to perform variable printing in which variable data are printed on advertising mails (or direct mails), posters, flyers, and the like.

The image forming apparatus for production printing uses the electrophotography technique that is identical to that used by the image forming apparatus for office use, for example. However, because the printed material output from the image forming apparatus for production printing is often the commercial product, the image quality required of the image forming apparatus for production printing is often higher than that required of the image forming apparatus for office use.

However, the image quality may be affected by the kind of recording medium used, even under identical printing conditions. For example, the different kinds of recording media may include plain paper, glossy paper, matte paper, envelope paper, film, and paper or sheet having different thicknesses and/or different sizes.

For this reason, the image forming apparatus may be provided with a setting function to accept characteristic values (for example, weight of transfer sheet, size or transfer sheet, glossiness of transfer sheet, and the like) of the transfer sheet from a user and to automatically set an image forming condition according to the characteristic values. An example of such an image forming apparatus is proposed in a Japanese Laid-Open Patent Publication No. 2006-276473. However, this proposed image forming apparatus may only cope with a general transfer sheet which is only one of a very large number of kinds of transfer sheets, and an optimum image formation may not be possible depending on the characteristic of the transfer sheet that is actually used. In this case, the image forming condition may be adjusted depending on the kind of transfer sheet that is actually used, but it requires complex management in order to manage combinations of the characteristic values and the image forming condition for each kind of transfer sheet.

In order to maintain the image quality of the printed material constant regardless of the kind of transfer sheet, the manufacturer of the image forming apparatus may investigate the characteristics, such as the toner adhesive property, for each transfer sheet to find an optimum image forming condition to be set in the image forming apparatus. However, the operation to find the optimum image forming condition is too difficult for the user, unless the user is very familiar with the operation and performance of the image forming apparatus. Consequently, the operation to find the optimum image forming condition is in many cases performed by a CE (Customer Engineer) of the manufacturer who is familiar with the operation and performance of the image forming apparatus.

FIGS. 1A through 1C are diagrams for explaining an example of a test printing to adjust the image quality. FIG. 1A illustrates an example of a test printing related mainly to toner density and image quality. Eight regions illustrated in FIG. 1A are printed at different toner densities, and the CE of the manufacturer checks the toner densities and finds the image forming condition that may avoid inconsistencies, unevenness, bias or the like in the toner density. FIG. 1B illustrates an example of a test printing mainly to test a fusing characteristic of the toner. Each of blocks illustrated in FIG. 1B are printed by varying conditions that affect the fusing characteristic of the toner, and the CE scrapes or scratches the printed surface, for example, and finds the image forming condition that results in the optimum toner fusing characteristic. FIG. 1C illustrates an example of a test printing to print a shading or hatching at a certain density. The CE finds the image forming condition in order not to generate a white spot or dot (insufficient toner), a blur (excessive toner), stripe noise and the like on the shading or hatching in FIG. 1C.

The image forming condition may be stored in the image forming apparatus as a set data group in which set data such as a secondary transfer reference current, a fusing temperature, and a linear velocity correction value, are grouped. The image forming apparatus may read the set data group that is set for each transfer sheet, and perform the printing to realize an optimum image quality based on the set data group.

However, the number of kinds of transfer sheets on the market is increasing, and it is becoming more and more difficult for the CE to cope with the individual transfer sheet. Hence, a Japanese Laid-Open Patent Publication No. 2008-102261 proposes an image forming system in which a relationship between the kind of transfer sheet and the set data group is stored in a server. According to this proposed image forming system, the image forming apparatus stores the set data group for each transfer sheet in the server that is connected to the image forming apparatus via a communication line, and the set data group is automatically set in the image forming apparatus from the server when the user selects the kind of transfer sheet. But in this case, the CE who is an expert on the image forming apparatus must manually add the combination of the kind of transfer sheet and the set data group when increasing the number of combinations of the kind of transfer sheet and the set data group stored in the server. For this reason, it is difficult from the practical point of view to cope with the number of kinds of transfer sheets that may increase on a day to day basis.

When the kind of transfer sheet desired by the user is not stored in the server, the Japanese Laid-Open Patent Publication No. 2008-102261 also proposes forming images on the desired kind of transfer sheet using a testing set data group for testing. In this case, the printed material output from the image forming apparatus may be read by an image reading apparatus, such as a scanner, in order to find the optimum set data group. The user may acquire the set data with respect to the kind of transfer sheet not stored in the server by performing a relatively easy procedure described above.

However, a satisfactory image quality may not be guaranteed using the set data group that is created using only the information acquired from the image reading apparatus, with respect to the user who requires a relatively high image quality. In this case, the CE who is specialized in evaluating the transfer sheet needs to evaluate the transfer sheet and determine the set data group based on the evaluation result.

For example, a Japanese Laid-Open Patent Publication No. 2009-271139 proposes a technique to evaluate the transfer sheet by an expert institution and to reflect the evaluation result in the server within a relatively short time. According to this proposed technique, the server that connected to the image forming apparatus is connected to a remote transfer sheet managing system via a communication line, and the evaluation result of the transfer sheet from the expert institution is reflected to the server.

However, according to the techniques proposed in the Japanese Laid-Open Patent Publications No. 2008-102261 and No. 2009-271139, the server must centrally manage the set data group for all of the kinds of transfer sheet. In addition, even when the user is unsatisfied with the image quality obtainable by the set data group managed by the server with respect to a certain kind of transfer sheet, the user may not modify the set data group stored with respect to this certain kind of transfer sheet. In other words, when a plurality of users are using the same kind of transfer sheet and one user is unsatisfied with the image quality obtainable using the set data group managed in the server with respect to the transfer sheet, while the other users are satisfied with the image quality, and the one user modifies the set data group with respect to the transfer sheet to obtain the image quality satisfactory to the one user, this image quality satisfactory to the one user may be unsatisfactory to the other users.

In order to enable all of the users to obtain the satisfactory image quality in the above described case, the server needs to manage the relationship between the kinds of transfer sheets and the set data group for each of the users. That is, the server needs to manage a number of set data groups corresponding to a product of the number of kinds of transfer sheets and the number of users. Consequently, the amount of data to be managed in the server becomes extremely large as the number of kinds of transfer sheets and/or the number of users increase, to thereby make the system operation difficult from the practical point of view.

SUMMARY OF THE INVENTION

Accordingly, it is a general object in one embodiment of the present invention to provide a novel and useful image forming apparatus, printing system, non-transitory computer-readable storage medium, and an image adjusting method, in which the problem described above may be suppressed.

Another and more specific object in one embodiment of the present invention is to provide an image forming apparatus, a printing system, a non-transitory computer-readable storage medium, and an image adjusting method, that enable printing at a desired image quality on the image forming apparatus of each user, even when the set data group is centrally managed by a server with respect to each kinds of transfer sheet.

According to one aspect of the present invention, there is provided an image forming apparatus including an identification information accepting unit configured to accept input of transfer sheet identification information; an image forming unit configured to form an image on a transfer sheet based on a control value corresponding to the transfer sheet identification information accepted by the identification information accepting unit; and a correction value accepting unit configured to accept input of a correction value of the control value, and store the correction value in correspondence with the transfer sheet identification information in a storage unit, wherein the image forming unit forms the image on the transfer sheet based on the control value that is corrected by the correction value when the control value is stored in correspondence with the transfer sheet identification information accepted by the identification information accepting unit.

According to another aspect of the present invention, there is provided a printing system including an information processing apparatus; and an image forming apparatus communicatable with the information processing apparatus via a network, wherein the image forming apparatus includes an identification information accepting unit configured to accept input of transfer sheet identification information; an image forming unit configured to form an image on a transfer sheet based on a control value corresponding to the transfer sheet identification information accepted by the identification information accepting unit; and a correction value accepting unit configured to accept input of a correction value of the control value, and store the correction value in correspondence with the transfer sheet identification information in a storage unit, wherein the image forming unit forms the image on the transfer sheet based on the control value that is corrected by the correction value when the control value is stored in correspondence with the transfer sheet identification information accepted by the identification information accepting unit.

According to still another aspect of the present invention, there is provided a non-transitory computer-readable storage medium that stores a program which, when executed by a computer, causes the computer to perform a process including an identification information accepting procedure causing the computer to accept input of transfer sheet identification information; an image forming procedure causing the computer to form an image on a transfer sheet based on a control value corresponding to the transfer sheet identification information accepted by the identification information accepting unit; and a correction value accepting procedure causing the computer to accept input of a correction value of the control value, and store the correction value in correspondence with the transfer sheet identification information in a storage unit, wherein the image forming procedure causes the computer to form the image on the transfer sheet based on the control value that is corrected by the correction value when the control value is stored in correspondence with the transfer sheet identification information accepted by the identification information accepting procedure.

Other objects and further features of the present invention will be apparent from the following detailed description when read in conjunction with the accompanying drawings.

BRIEF DESCRIPTION OF THE DRAWINGS

FIG. 2 is a diagram for explaining an example of an image forming apparatus in a first embodiment;

FIG. 8 is a diagram illustrating an example of set data groups;

FIG. 9 is a diagram illustrating an example of fine-adjustment data;

FIG. 10 is a diagram illustrating an example of a screen from which a user makes a fine-adjustment of an image quality;

FIG. 13 is a diagram illustrating an example of a screen from which the operator makes the fine-adjustment of the image quality;

FIG. 14 is a diagram illustrating an example of set data and fine-adjustment data in a second embodiment;

FIG. 16 is a diagram illustrating an example of information collected by the server.

DESCRIPTION OF THE PREFERRED EMBODIMENTS

A description will be given of embodiments of an image forming apparatus, a printing system, a non-transitory computer-readable storage medium, and an image adjusting method according to the present invention, by referring to FIG. 2 and subsequent figures.

[First Embodiment]

Figure 1A:
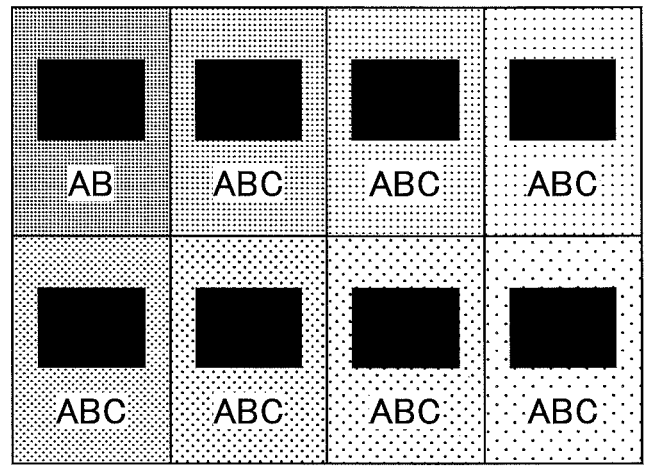
FIGS. 1A through 1C are diagrams for explaining an example of a test printing to adjust the image quality.
Figure 1B:
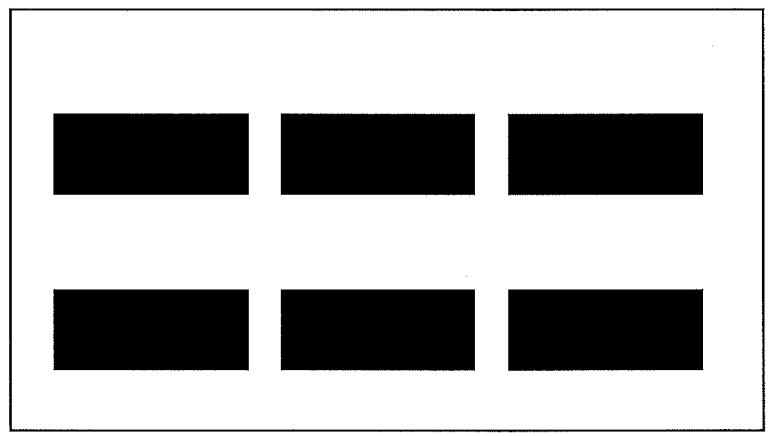
Figure 1C:
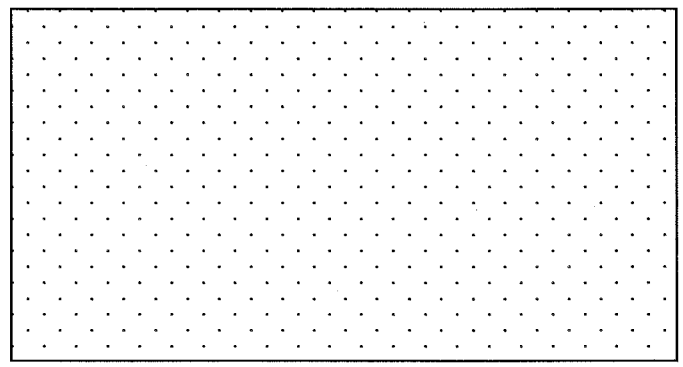

FIG. 2 is a diagram for explaining an example of an image forming apparatus in a first embodiment of the present invention. It is assumed for the sake of convenience that a server 200 stores set data groups that are obtained by evaluating the characteristics of performances of various kinds of transfer sheets by an expert (or professional) institution using an arbitrary technique, including the technique described above in conjunction with FIGS. 1A through 1C.

An image forming apparatus 100 illustrated in FIG. 2 may download the set data group of the kind of transfer sheet to be used by the user, from the server 200. Hence, many users may perform the printing in accordance with the characteristics of the transfer sheet by using the set data group. On the other hand, when a certain user is unsatisfied with the image quality obtainable using the set data group, this certain user may perform a fine-adjustment on the set data group. In the following description, "fine-adjustment data" refers to the set data corresponding to the fine-adjustment that is performed with respect to the set data group. Thus, each individual user of the image forming apparatus 100 may use the set data group and perform the printing with the image quality desired by each individual user.

The expert institution may be any institution run by a manufacturer to evaluate characteristics of performances of transfer sheets, and does not necessarily have to be a standardization organization or a public organization. The user may be a corporate user of the image forming apparatus 100 or an individual (or general) user of the image forming apparatus 100. In the following description, the corporate user may be referred to as the "user", and the individual user may be referred to as the "operator". However, the term "user" may be used to refer to both the corporate user and the individual user when unnecessary to clearly distinguish the corporate user and the individual user.

[Structure]

Figure 3:
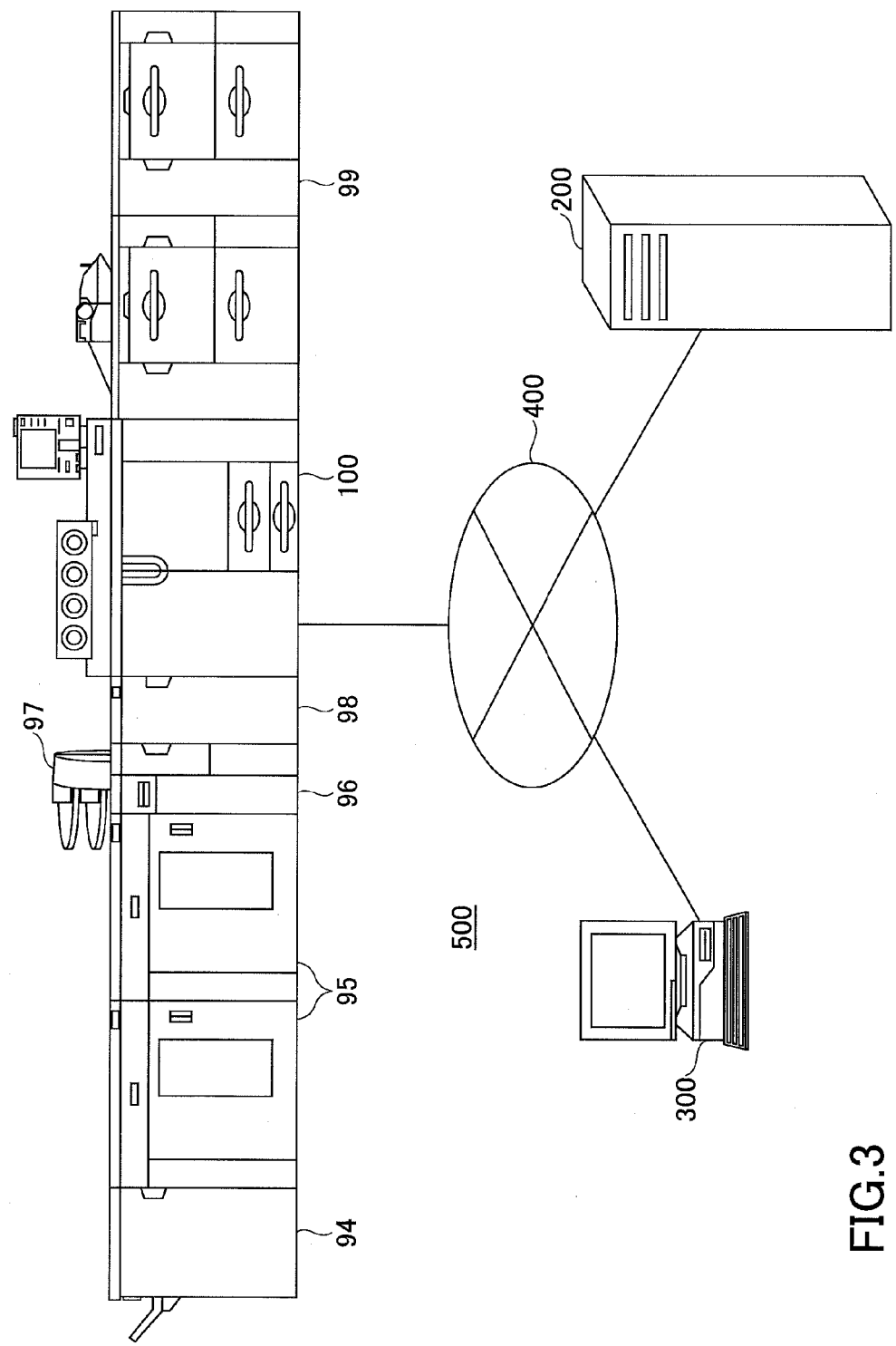
FIG. 3 is a diagram illustrating a structure of an example of a printing system in the first embodiment.

FIG. 3 is a diagram illustrating a structure of an example of a printing system in the first embodiment. A printing system 500 illustrated in FIG. 3 includes a server 200, an image forming apparatus 100, and a PC (Personal Computer) 300 that are connected via a network 400. The server 200 is run by the expert institution, and stores the set data groups. Of course a plurality of servers 200 may be provided in place of the single server 200 illustrated in FIG. 3. In addition, only a storage unit that stores the set data group may be connected to network 400.

The image forming apparatus 100 may be implemented with various optional functions. However, the optional functions may be omitted in this embodiment. The image forming apparatus 100 includes an image forming function to form images on the transfer sheet. Hence, the image forming apparatus 100 may be formed by a MFP (Multi-Function Peripheral) that includes at least one of a scanner function and a facsimile function in addition to the image forming function.

Next, a description will be given of the optional functions. A sheet supply tray unit 99 is capable of holding a relatively large amount of transfer sheets in a stack to be supplied. A cooling unit 98 cools the transfer sheet after the image is formed thereon. An insert feeder 97 inserts a cover sheet, a recycle sheet, a slip sheet, and the like between the transfer sheets. A Z-fold unit 96 folds the transfer sheet in a Z-fold. A stacker 95 stacks the printed transfer sheets in a state in which the stack may be transported on a carriage or the like. A finisher 94 stacks the transfer sheet while binding or aligning the transfer sheets. Additional units may be connected to provide other optional functions, including a stapler unit to staple or bind the transfer sheets, for example.

The PC 300 is operated by the user to send print data to the image forming apparatus 100. The user may operate the PC 300 to start an application program (for example, illustration software, word processing software, PDF (Portable Document Format) software, etc.) in order to create document data. When the user instructs the printing of the document data to the PC 300, the application program requests the printing of the document data to a graphics controller (for example, GDI (Graphics Device Interface)) of an OS (Operating System). The graphics controller generates a rendering instruction (intermediate file) to render the document data by an API (Application Program Interface or, basic function) that does not depend on the application program.

Thereafter, the graphics controller calls a printer driver that generates PDL (Page Description Language) corresponding to the image forming apparatus 100. A DDI (Device Driver Interface) is defined between the graphics controller and the printer driver. The printer driver converts the intermediate file into the PDL data that may be interpreted in the image forming apparatus 100, and sends the PDL data to the image forming apparatus 100.

The PDL data may employ a known format such as PostScript, PCL, RPCS, PDF, XPF, and the like. The PDL data may employ an arbitrary format as long as the image forming apparatus 100 is able to interpret the PDL data.

Instead of sending the PDL data from the PC 300 to the image forming apparatus 100, a storage medium recorded with the PDL data may be coupled to the image forming apparatus 100 in order to register the PDL data in the image forming apparatus 100.

Figure 4:
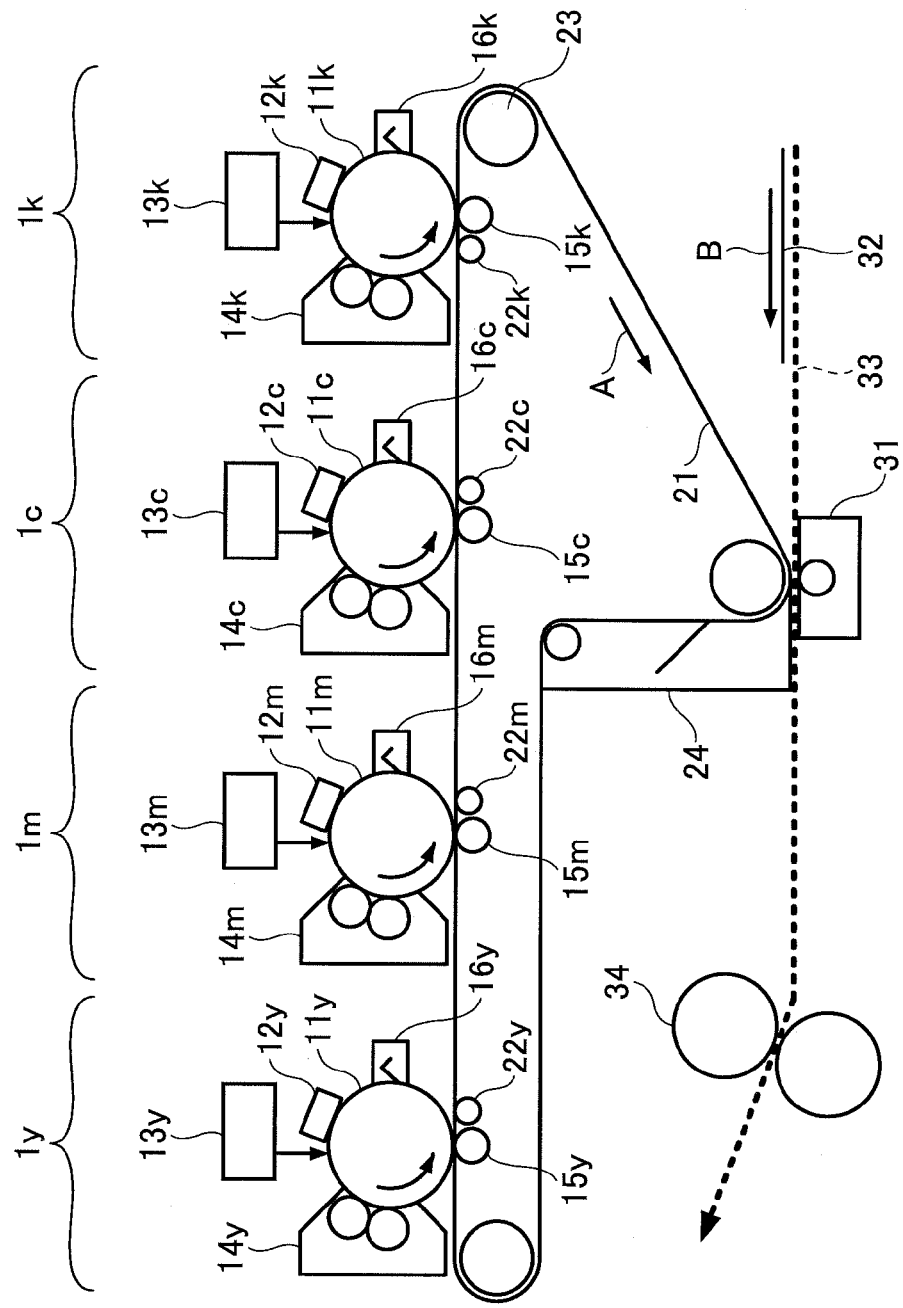
FIG. 4 is a diagram illustrating a structure of an example of the image forming apparatus.

FIG. 4 is a diagram illustrating a structure of an example of the image forming apparatus 100. A description will be given of the printing employing the electrophotography technique. The image forming apparatus 100 illustrated in FIG. 4 may form any one of a printing apparatus, a copying apparatus, a facsimile apparatus, a scanner apparatus, and a MFP. The illustration of the sheet supply part and the like is omitted, and only basic parts related to the image formation are illustrated in FIG. 4.

The image forming apparatus 100 forms yellow (Y), magenta (M), cyan (C), and black (K) toner images on photoconductive drums $11y$, $11m$, $11c$, and $11k$, respectively. Image forming units $1y$, $1m$, $1c$, and $1k$ form an image forming unit or an image forming unit group. The image forming units $1y$, $1m$, $1c$, and $1k$ provided in peripheries of the corresponding photoconductive drums $11y$, $11m$, $11c$, and $11k$.

The image forming units $1y$, $1m$, $1c$, and $1k$ respectively include drum charging units $12y$, $12m$, $12c$, and $12k$, exposure units $13y$, $13m$, $13c$, and $13k$, developing units $14y$, $14m$, $14c$, and $14k$, transfer units $15y$, $15m$, $15c$, and $15k$, and drum cleaning units $16y$, $16m$, $16c$, and $16k$.

The image forming units $1y$, $1m$, $1c$, and $1k$ respectively form toner images of different colors, namely, the yellow, magenta, cyan, and black toner images. A transfer belt 21 overlaps the toner image of different colors. Contact rollers $22y$, $22m$, $22c$, and $22k$ cause the transfer belt 21 to contact the photoconductive drums $11y$, $11m$, $11c$, and $11k$ when transferring the toner images onto the transfer belt 21. A belt driving roller 23 and a belt cleaning unit 24 are provided in the periphery of the transfer belt 21. A secondary transfer unit 31 is located at a position opposing a lower end of the transfer belt 21. A transfer sheet 32 passes a transport path 33 between the secondary transfer unit 31 and the transfer belt 21, and reaches a fixing unit 34.

As an example, the image forming process of the image forming unit $1y$ with respect to the yellow toner image will be described, because the image forming processes of the other image forming units $1m$, $1c$, and $1k$ are basically the same as that of the image forming unit $1y$. When the photoconductive drum $11y$ starts to rotate, a high voltage is applied to the drum charting unit $12y$, and the surface of the photoconductive drum $11y$ is uniformly charged by a negative charge. In addition, the contact roller $22y$ moves upwards and makes the transfer belt 21 contact the photoconductive drum $11y$. Then, a controller (not illustrated) sends image information with respect to the image forming apparatus 100, and the exposure unit $13y$ controls ON and OFF states of an light emission signal depending on the image information. Hence, a laser beam is irradiated on the surface of the photoconductive drum $11y$ at selected portions depending on the image information, and the negative charge decreases at the surface portions irradiated by the laser beam.

When the surface portions of the photoconductive drum $11y$ where the negative charge decreased reaches the position opposing the developing unit $14y$, the yellow toner adheres onto the surface portions where the negative charge decreased and forms the yellow toner image.

When the yellow toner image on the photoconductive drum $11y$ reaches the position where the photoconductive drum $11y$ makes contact with the transfer belt 21, the yellow toner image is transferred onto the transfer belt 21 by the action of the high voltage applied to the transfer unit $15y$. Thereafter, after making contact with the transfer belt 21, the photoconductive drum $11y$ passes the drum cleaning unit $16y$ that removes the residual toner and the like on the surface of the photoconductive drum $11y$.

The toner images are formed on the photoconductive drums $11m$, $11c$, and $11k$ by processes similar to the image forming process with respect to the photoconductive drum $11y$. A full color toner image is formed on the transfer belt 21 when the yellow, magenta, cyan, and black toner images on the photoconductive drums $11y$, $11m$, $11c$, and $11k$ are transferred onto the transfer belt 21 in an overlapping manner.

The transfer belt 21 is transported in an arrow direction A by the belt driving roller 23. At the same time as when the full color toner image on the transfer belt 21 reaches the position confronting the secondary transfer unit 31, the transfer sheet 31, which is an example of a sheet-shaped recording medium, is transported along the transport path 33 in an arrow direction B and simultaneously reaches the position confronting the secondary transfer unit 31. Hence, the full color image is transferred onto the transfer sheet 32 by the action of a high voltage applied to the secondary transfer unit 31. The full color image on the transfer sheet 32 is fused and fixed as the transfer sheet 32 passes the fixing unit 34. On the other hand, the transfer belt 21 passing the position confronting the secondary transfer unit 31 then passes the belt cleaning unit 24 which removes the residual toner and the like on the surface of the transfer belt 21.

Accordingly, in the image forming apparatus 100, the toner images formed by the image forming units $1y$, $1m$, $1c$, and $1k$ are transferred onto the transfer sheet 32 by the transfer belt 21, the transfer units $15y$, $15m$, $15c$, and $15k$, and the secondary transfer unit 31, and are finally fixed on the transfer sheet 32 by the fixing unit 34.

There are various kinds of transfer sheets available on the market. The characteristics, such as the thickness, size, content (materials or components included), surface smoothness, moisture content, existence of a coating, type of coating, and the like of the various kinds of transfer sheets differ. The control contents of the image forming units, the transfer units, and the fixing unit must be adjusted depending on the different characteristics of the transfer sheets, in order to obtain a printed material output having an image quality satisfactory to the user.

Figure 5:
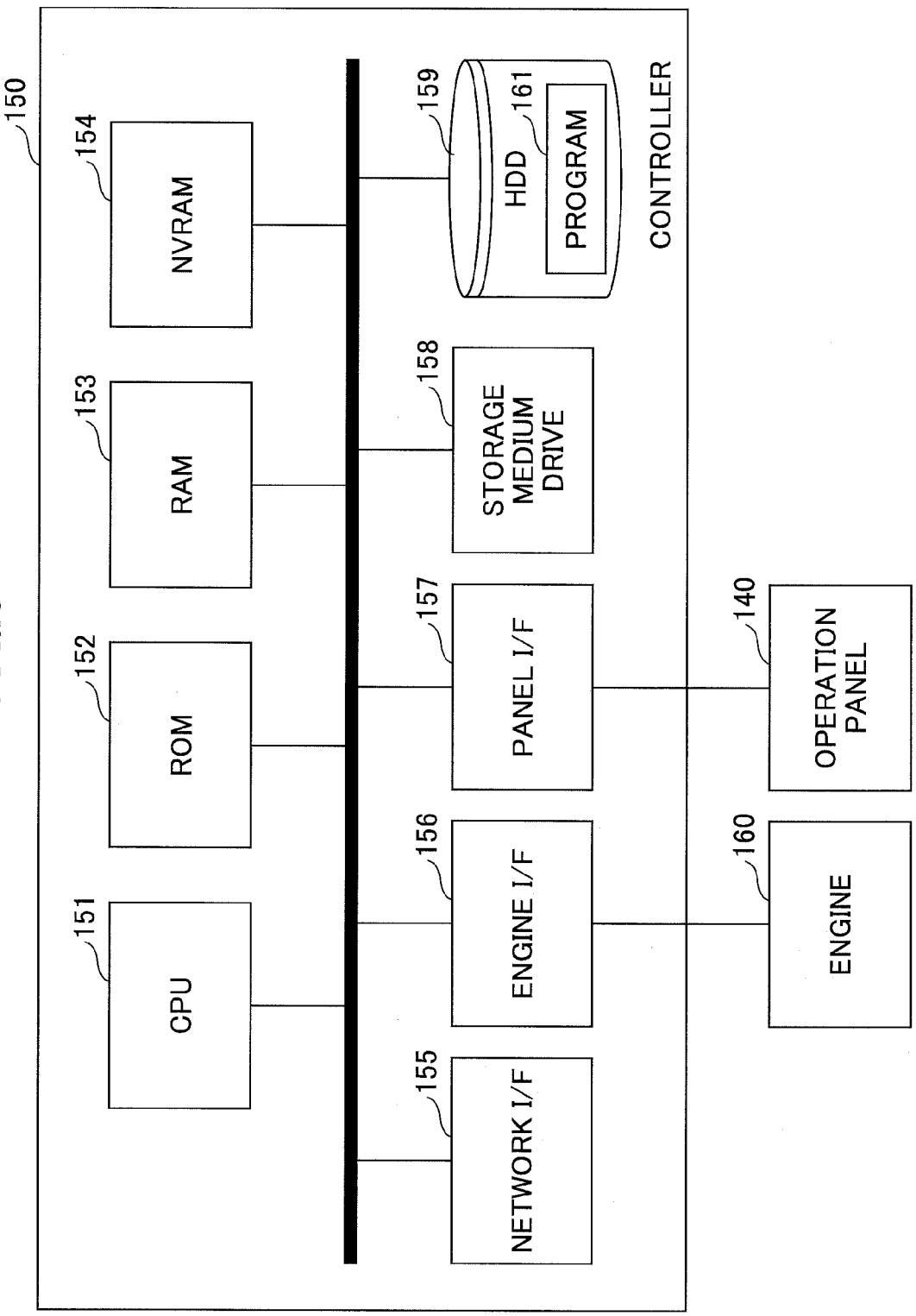
FIG. 5 is a block diagram illustrating a hardware structure of an example of a controller of the image forming apparatus.

FIG. 5 is a block diagram illustrating a hardware structure of an example of the controller of the image forming apparatus. A controller 150 of the image forming apparatus 100 illustrated in FIG. 5 includes functions of a general-purpose computer.

The image forming apparatus 100 illustrated in FIG. 5 includes the controller 150 that controls the entire image forming apparatus 100, an engine 160 to print the image on the transfer sheet, and an operation panel 140 to provide a user interface with respect to the operator. The controller 150 includes a CPU (Central Processing Unit) 151, a ROM (Read Only Memory) 152, a RAM (Random Access Memory) 153, a NVRAM (Non-Volatile RAM) 154, a network interface (I/F) 155, an engine interface (I/F) 156, a panel interface (I/F) 157, a storage medium drive 158, and a HDD (Hard Disk Drive) 159.

The ROM 152 may store starting (or booting) programs, initial set values, and the like. The ROM 153 may provide a page memory that is created by the controller 150, a work memory used by software for operation thereof, and the like. The NVRAM 154 may provide a non-volatile memory space to store a print condition and the like that is set to the image forming apparatus 100. The network I/F 155 enables exchange of data between the image forming apparatus 100 and apparatuses connected to the network 400, such as the server 200 and the PC 300. The engine I/F 156 controls the engine 160 by sending a print instruction and the like. The engine 160 includes at least a plotter engine to perform the image forming process described above. The plotter engine may employ an ink-jet technique. The engine 160 may also include a scanner engine and/or a facsimile engine. The storage medium drive 158 provides an interface (I/F) to detachably (or removably) connect a portable storage medium, such as an external (or removable) storage medium 134. For example, the storage medium drive 158 may be a slot configured to receive the portable storage medium such as a semiconductor memory, or a drive configured to receive a portable storage medium such as a disk.

The operation panel 140 includes an input part operable by the operator to input instructions and the like to the image forming apparatus 100, and a display part to display messages and the like to the operator. The input part may include hardware keys (or physical buttons) and various virtual keys displayed on the display part. The display part may be formed by a LCD (Liquid Crystal Display) to display operation menus, virtual keys and the like on a GUI (Graphical User Interface) screen. For example, the operation panel 140 may be formed by a touchscreen panel which integrally includes the input part and the display part having virtual keys operable by the operator.

The panel I/F 157 controls input and output between the image forming apparatus 100 and the operation panel 140. The HDD 159 is one example of a non-volatile storage unit or memory, and may be replaced by a flash memory and the like. Characteristic data and programs 161, which will be described later, may be stored in a disk within the HDD 159.

Figure 6:
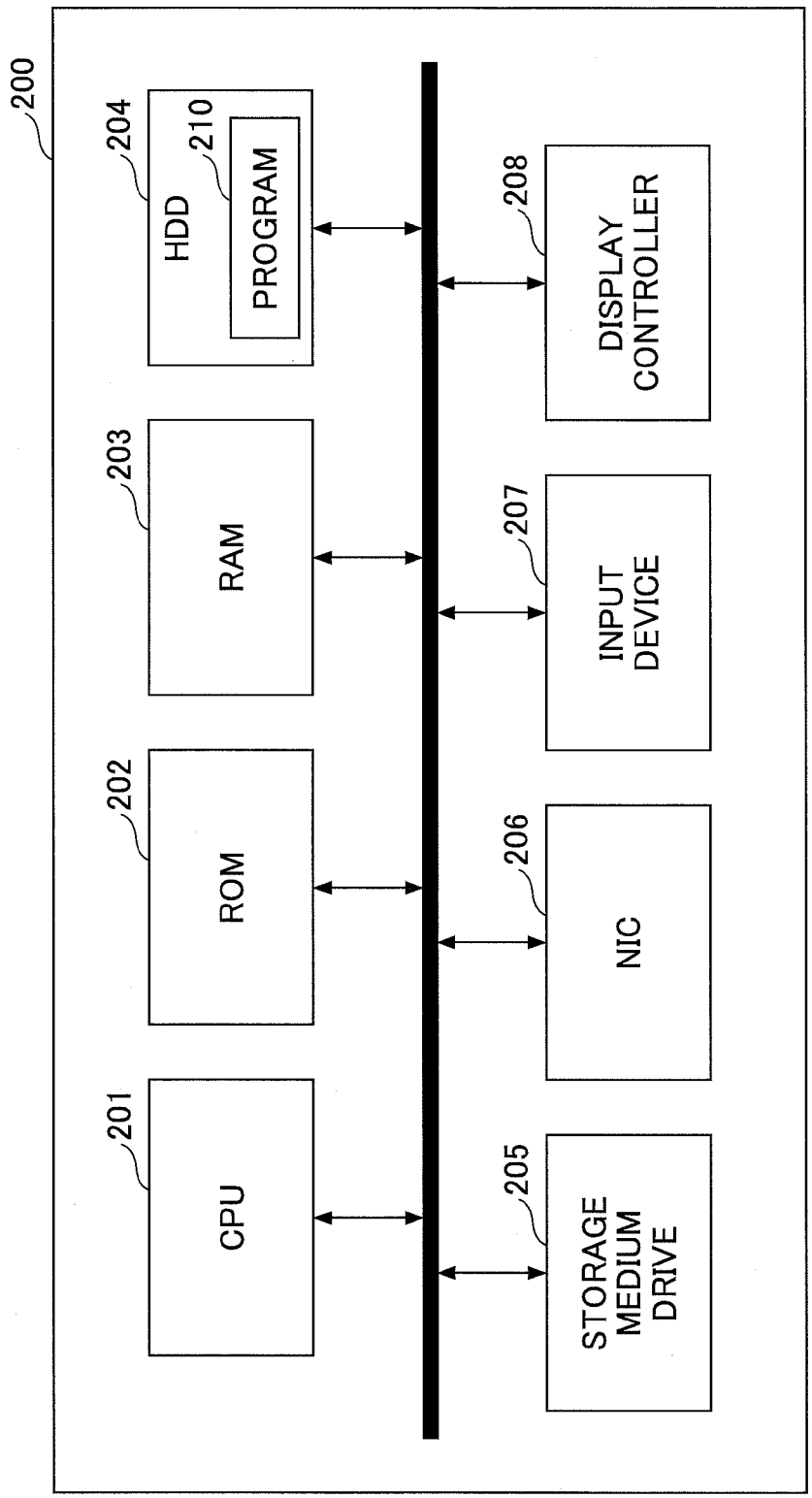
FIG. 6 is a block diagram illustrating a hardware structure of an example of a server.

FIG. 6 is a block diagram illustrating a hardware structure of an example of the server. The server 200 illustrated in FIG. 6 includes a CPU 201, a ROM 202, a RAM 203, a HDD 204, a storage medium drive 205, a NIC (Network Interface Card) 206, an input device 207, and a display controller 208. The structure of the server 200 illustrated in FIG. 6 is known, and a description thereof will be omitted. Programs 210 and the like may be stored in a disk within the HDD 204. The storage medium drive 205 may be the same as the storage medium drive 158 illustrated in FIG. 5.

Figure 7:
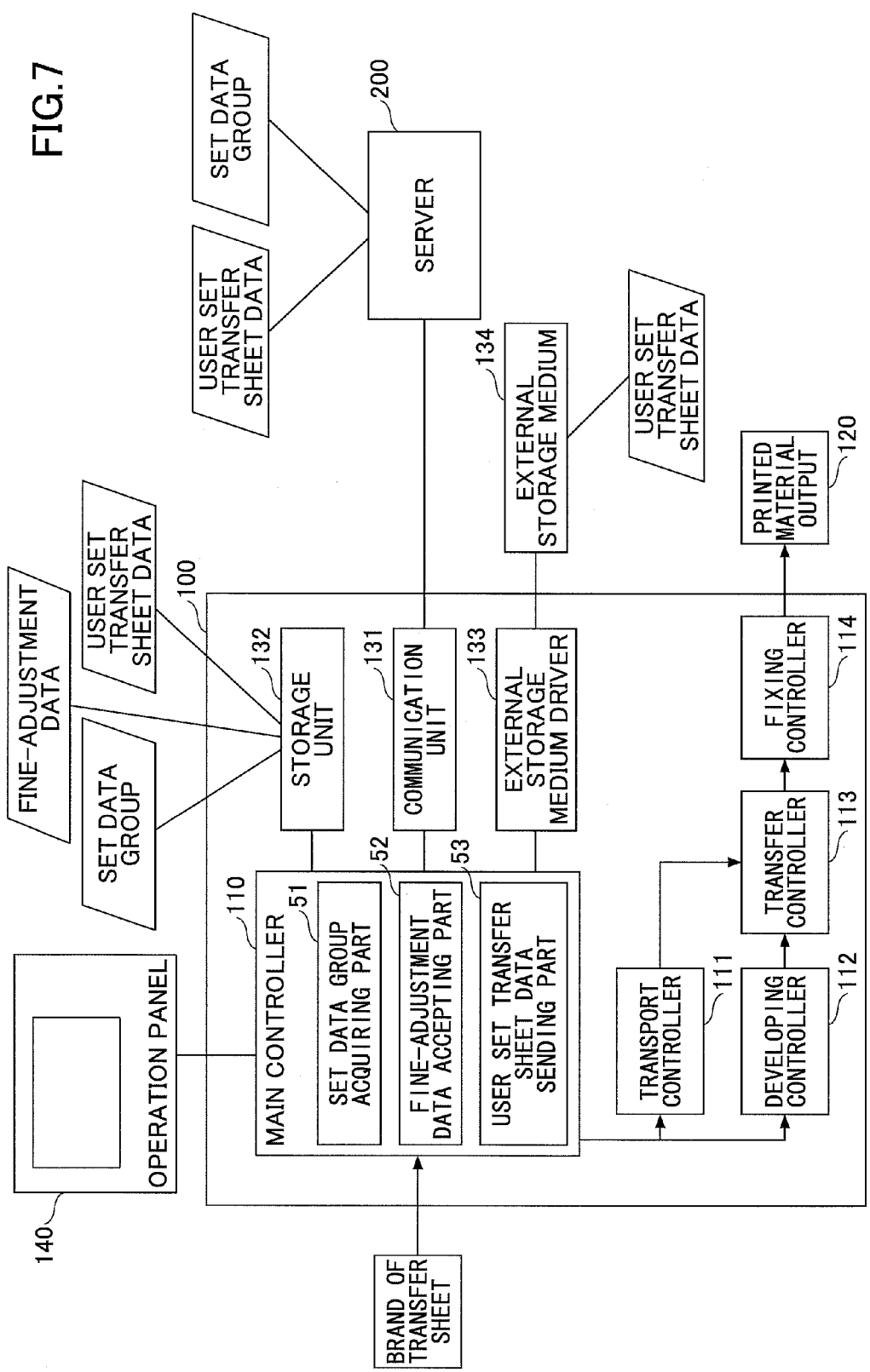
FIG. 7 is a functional block diagram illustrating an example of the printing system.

FIG. 7 is a functional block diagram illustrating an example of the printing system. In FIG. 7, those parts that are the same as those corresponding parts in FIG. 5 are designated by the same reference numerals, and a description thereof will be omitted.

The image forming apparatus 100 illustrated in FIG. 7 includes the operation panel 140, a main controller 110, a storage unit 132, a communication unit 131, an external storage medium driver 133, a transport controller 111, a developing controller 112, a transfer controller 113, and a fixing controller 114. The storage unit 132 may be formed by the HDD 158 illustrated in FIG. 5, for example. The communication unit 131 may be formed by the network I/F 155 illustrated in FIG. 5, for example.

The external storage medium driver 133 may be formed by the storage medium driver 158 illustrated in FIG. 5, for example, and may include a slot for detachably receiving the external storage medium 134. The external storage medium 134 may be formed by a flash memory, including a USB (Universal Serial Bus) memory, a SD (Secure Digital) card, and the like. User set transfer sheet data which will be described later are stored in the external storage medium 134. In addition, the user set transfer sheet data may be distributed in the state stored in the external storage medium 134 or, distributed by being downloaded from the server 200, for example.

The main controller 110 controls the entire software of the image forming apparatus 100. The functions of the main controller 110, the transport controller 111, the developing controller 112, the transfer controller 113, and the fixing controller 114 may be provided by executing one or more programs 161 by the CPU 151 in cooperation with hardware, such as ASIC (Application Specific Integrated Circuit), that controls motors, heaters, and the like.

The main controller 110 controls the entire image forming apparatus 100, and acquires the set data groups from the server 200, and stores the set data groups in correspondence with fine-adjustment data. The main controller 110 includes a set data group acquiring part 51, a fine-adjustment data accepting part 52, and a user set transfer sheet data sending part 53.

The set data group acquiring part 51 accepts a brand of transfer sheet input by the operator, and sends the brand of transfer sheet to the server 200, in order to acquire the set data group corresponding with the brand of transfer sheet. The fine-adjustment data accepting part 52 accepts from the operator the fine-adjustment data and a new brand of transfer sheet (brand of user set transfer sheet) added with the fine-adjustment data. When the operator inputs the brand of user set transfer sheet, the fine-adjustment data accepting part 52 copies the set data group, and stores the copied set data group and the fine-adjustment data in correspondence with the brand of user set transfer sheet. The brand of user set transfer sheet, the copied set data group, and the fine-adjustment data form one "user set transfer sheet data".

It is assumed for the sake of convenience that, when the image forming apparatus 100 is forwarded, at least one set data group of a general transfer sheet, such as plain paper, is stored in the storage unit 132.

The user set transfer sheet data sending part 53 sends to the server 200 identification information of the image forming apparatus 100 and the user set transfer sheet data (that is, the brand of user set transfer sheet, the copied set data group, and the fine-adjustment data).

The transport controller 111 controls the transfer sheet transport path 333, and controls the position and transport velocity of the transfer sheet. The developing controller 112 controls the image forming units 1y, 1m, 1c, and 1k, and controls rotational velocities of the photoconductive drums 11y, 11m, 11c, and 11k, charging voltages of the photoconductive drums 11y, 11m, 11c, and 11k, amounts of toners adhered on the photoconductive drums 11y, 11m, 11c, and 11k, and the like. The transfer controller 113 controls the transfer belt 21, the transfer units 15y, 15m, 15c, and 15k, and the secondary transfer unit 31, and controls a rotational velocity of the transfer belt 21, and bias voltages of the transfer units 15y, 15m, 15c, and 15k and the secondary transfer unit 31. The fixing controller 114 controls the fixing unit 34, and controls a temperature of the fixing unit 34, and a pressing force between a heating roller and a pressing roller of the fixing unit 34.

The storage unit 132 may store the set data groups, the fine-adjustment data, and the brand of user set transfer sheet, as will be described later.

The brand of transfer sheet is the identification information of the transfer sheet, and is selected by the operator and input from the operation panel 140. A printed material output 120 is the transfer sheet that is printed with the image and output from the image forming apparatus 100.

As described above, the image forming apparatus 100 is communicably connected to the server 200 via the communication unit 131. The server 200 stores the set data group of the transfer sheet and the user set transfer sheet data. The set data group stored in the server 200 is the original of the set data group acquired by the image forming apparatus 100. Hence, a part of or all of the set data groups stored in the server 200 is the same as the set data groups acquired by the image forming apparatus 100. Similarly, a part of or all of the user set transfer sheet data stored in the server 200 is the same as the user set transfer sheet data acquired by the image forming apparatus 100.

The server 200 may also include a remote monitoring function to function as a remote monitoring server that remotely monitors the image forming apparatus 100. The remote monitoring function constantly monitors the image forming apparatus 100 via a firewall, and collects information such as a number of prints made, a remaining amount of toner, error information, and the like. Hence, the remote monitoring function may send the CE and prevent the toner from running out in the image forming apparatus 100, for example, in order to prevent the availability of the image forming apparatus 100 from deteriorating.

[Set Data Group]

FIG. 8 is a diagram illustrating an example of the set data groups. The set data groups may be stored in the image forming apparatus 100 and the server 200, and the format with which the set data groups are stored may be the same for the image forming apparatus 100 and the server 200. In FIG. 8, one line corresponds to one set data group, and each set item in one line corresponds to one set data. In the example illustrated in FIG. 8, one set data group includes three set data. FIG. 8 in its entirety corresponds to a list of the set data groups.

The set data group includes the set data of the secondary transfer reference current, the fixing unit temperature, the linear velocity correction value, and the like in correspondence with the brand of transfer sheet. However, the set data illustrated in FIG. 8 are only examples, and may include various other information such as a voltage value and/or a current value affecting the image quality on the transfer sheet. The set data groups may be registered in one of two ways, for example. One way may be to register the set data groups by an expert organization. Another way may be to register the set data groups by the CE who operates the image forming apparatus 100.

The brand of transfer sheet may be the name of the transfer sheet determined at the time when the expert institution evaluates the transfer sheet. One example of the brand of transfer name may include "name of manufacturer of the transfer sheet or name of vendor company selling the transfer sheet" and "product name of the transfer sheet" and "attribute of the transfer sheet affecting the image quality".

The examples illustrated in FIG. 8 combine the name of the manufacturer of the transfer sheet or the name of the vendor company setting the transfer sheet, namely, companies CA and CB, and product names of the transfer sheets, namely, transfer sheets A, B, and C. The product name in many cases includes information that enables plain paper, glossy paper, matte paper, film, and the like to be distinguished from one another. For this reason, many of the transfer sheets may be distinguished based on the product name.

The illustration of the attribute of the transfer sheet affecting the image quality is omitted in FIG. 8. However, this attribute may include the thickness (mm), the size, and the like of the transfer sheet. By including in the brand of transfer sheet the attribute that makes the image quality different even for the transfer sheets having the same product name, the operator may select the correct brand of transfer sheet to call the appropriate set data group.

A transfer sheet identification (ID) to uniquely identify the brand of transfer sheet may be added or assigned in the server 200 in addition to the brand of transfer sheet.

On the other hand, when the brand of transfer sheet and the set data group are not determined by the expert organization, the brand of transfer sheet and the set data group may be sent to the server 200 by the CE who determined the set data group by operating the image forming apparatus 100, in order to register the brand of transfer sheet and the set data group.

In this case, the CE adds or assigns the brand of transfer sheet according to a rule to add or assign the brand of transfer sheet. Alternatively, the CE may send information (for example, name of manufacturer) related to the transfer sheet to the server 200, and request the server 200 to add or assign the brand of transfer sheet. The information related to the transfer sheet may be included in a bar code or the like printed on a package (or packing paper) of the transfer sheets. The image forming apparatus 100 may read and decode the bar code, and extract the transfer sheet data, such as the thickness and size, from the decoded information, in order to send the transfer sheet data to the server 200. The server 200 may thus add or assign the brand of transfer sheet based on the transfer sheet data, and store the brand of transfer sheet together with the set data group.

The set data group registered by the CE via the image forming apparatus 100 is preferably also stored in the image forming apparatus. Hence, the server 200 sends the brand of transfer sheet that is added or assigned to the image forming apparatus 100. Therefore, the image forming apparatus 100 may store the set data groups in correspondence with the brands of transfer sheet common to the server 200.

The secondary transfer reference current is the current value required to control the bias current supplied to the secondary transfer unit 31 from the transfer controller 113. The larger the secondary transfer reference current, the higher the bias voltage of the secondary transfer unit 31, and the easier the transfer of the toner image from the transfer belt 21 to the transfer sheet. However, if the secondary transfer reference current is excessively large, inconveniences may be generated with regard to the withstand voltage performance of parts. For this reason, the secondary reference current may be set to an appropriate value based on test results such as those illustrated in FIGS. 1A through 10, for example.

The fixing unit temperature may be the temperature of the heating roller of the fixing unit 34. Generally, the higher the fixing unit temperature, the more the fusing (or fixing) characteristic of the toner on the transfer sheet improves. However, when the fixing unit temperature is excessively high, it is known that the glossiness deteriorates. For this reason, the fixing unit temperature may be set to an appropriate value based on test results such as those illustrated in FIGS. 1A through 10, for example.

The linear velocity correction value corrects the linear velocity (or surface velocity) of the transfer belt 21 and the photoconductive drums 11y, 11m, 11c, and 11k. The higher the surface velocity of the transfer belt 21, the more the productivity improves. However, when the surface velocity of the transfer belt 21 is excessively high, inconsistencies, unevenness, bias or the like may be generated in the printed image. On the other hand, when the surface velocity of the transfer belt 21 is excessively low, the transfer characteristic of the transfer belt 21 deteriorates. For this reason, the surface velocity may be set to an appropriate value based on test results such as those illustrated in FIGS. 1A through 10, for example.

The image forming apparatus 100 acquires the brand of transfer sheet of the set data groups illustrated in FIG. 8 from the server 200, when starting the image forming apparatus 100 or, once a day or, periodically, for example, and stores the acquired brand of transfer sheet in the storage unit 132. In addition, the set data group of the transfer sheet that is once used by the operator is cached and stored in the storage unit 132.

The operator operates the operation panel 140 to display a list of brand of transfer sheets, and selects the brand of transfer sheet to be used from the displayed list. Then, the set data group acquiring part 51 of the main controller 110 controls the communication unit 131 to send the brand of transfer sheet, and acquires the set data group of the brand of transfer sheet to be used from the server 200. Hence, the user may perform the printing using the optimum set data group for the brand of transfer sheet to be used.

On the other hand, instead of selecting the brand of transfer sheet from the list, the operator may input the brand of transfer sheet manually from the operation panel 140. In addition, the operator may input the brand of transfer sheet by reading the bar code or the like printed on the package (or packing paper) of the transfer sheets using the image forming apparatus 100. A situation may occur in which the brand of transfer sheet prepared (or purchased) by the user is not registered in the server 200. In this case, the operator may set the kind of transfer sheet (for example, plain paper, glossy paper, matte paper, etc.), the thickness of the transfer sheet, and the size of the transfer sheet from the operation panel 140. The kind of transfer sheet, the thickness and size of the transfer sheet may be referred to as the "transfer sheet data". The main controller 110 may specify the brand of transfer sheet closest to the input transfer sheet data, from the transfer sheets stored in the storage unit 132, and perform the printing using the set data group of the specified brand of transfer sheet.

[Fine-Adjustment Data]

FIG. 9 is a diagram illustrating an example of the fine-adjustment data. The fine-adjustment data is registered for each brand of transfer sheet. The set data group includes parameters that are used to perform the image formation in order to obtain the image quality that is regarded as being the optimum image quality by the expert institution or the CE for the brand of transfer sheet. However, the image quality of the printed material output 120, regarded as being the optimum image quality by the expert institution or the CE, may not be satisfactory to the user depending on the user's preference or taste or, the change in the performance of the image forming apparatus 100 due to aging or the like. In such a case, the operator may perform fine-adjustments on the image quality from the operation panel 140.

FIG. 10 is a diagram illustrating an example of a screen from which the user makes the fine-adjustment of the image quality. The operator displays the screen illustrated in FIG. 10 on the operation panel 140 by operating the operation panel 140 from an initial setting screen, for example, when the operator wishes to perform the fine-adjustment of the image quality. The screen illustrated in FIG. 10 may be displayed by the fine-adjustment data accepting part 52 of the main controller 110. The screen illustrated in FIG. 10 may be displayed on the PC 300 and enable the operator to perform the fine-adjustment from the PC 300. In the screen illustrated in FIG. 10, a fine-adjustment value field 301, a plus button 302, and a minus button 303 are displayed for each item that is finely adjustable by the user.

The finely adjustable items include the image density adjustment, abnormal image quality improvement, fixing strength adjustment, and registration adjustments, which are similar to the fine-adjustment data illustrated in FIG. 9. An integer is displayed in the fine-adjustment value field 301. When the fine-adjustment value displayed in the fine-adjustment value field 301 is zero (0), it is indicated that the set data of the corresponding fine-adjustment item is not to be finely adjusted, that is, the image forming apparatus 100 is to print using the set data as it is.

When the operator pushes the plus button 302 and increases the fine-adjustment value in units of fine-adjustment steps, the fine-adjustment value displayed in the fine-adjustment value field 301 is increased in steps of "1", "0.1", or the like. Similarly, when the operator pushes the minus button 303 and decreases the fine-adjustment value in units of fine-adjustment steps, the fine-adjustment value displayed in the fine-adjustment value field 301 is decreased in steps of "1", "0.1", or the like. The units of fine-adjustment steps may be determined in advance by the manufacturer for each kind of set data. The larger the fine-adjustment value of the image density adjustment, the darker the density of the printed material output 120. The image density adjustment may be possible for each toner color.

The abnormal image quality improvement refers to elimination of white spots (or white dots) or blur (or dark spots) that may be generated in the printed material output 120. The white spots may be generated when the toner is not adhered (or insufficient amount of toner) at the location on the transfer sheet where the toner should adhere, and occur mainly when the secondary transfer current value is excessively high. On the other hand, the blur may be generated in the printed material output 120 when the toner density is partially high (due to excessive amount of toner or accumulation of granular toner) at the location on the transfer sheet where the toner density should be constant, and occurs mainly when the secondary transfer current value is excessively low. The fine-adjustment of the abnormal image quality improvement may be made by changing the value from a standard adjustment value (±0) towards the minus (−) side when improving the white spots, and towards the plus (+) side when improving the blur. The larger the amount of change from the standard adjustment value, the larger the amount of fine-adjustment of the abnormal image quality improvement.

The fixing strength adjustment adjusts the fixing strength of the toner on the transfer sheet by the fine-adjustment. The larger the fine-adjustment value of the fixing strength adjustment, the greater the fixing strength of the toner on the printed material output 120.

The registration adjustment adjusts the position of the image formation on the transfer sheet, in a main scan direction and in a sub scan direction. The main scan direction is perpendicular to the transfer sheet transport direction in which the transfer sheet is transported. The sub scan direction is parallel to the transfer sheet transport direction. The left end of the transfer sheet with respect to the transfer sheet transport direction becomes the reference for the registration adjustment in the main scan direction. On the other hand, the upper end of the transfer sheet with respect to the transfer sheet transport direction becomes the reference for the registration adjustment in the sub scan direction. The larger the fine-adjustment value of the registration adjustment, the more the image formation position may be shifted in a direction away from the reference.

The fine-adjustment value may be freely adjusted by the operator. On the other hand, when the fine-adjustment value is freely adjusted, the image formation may become difficult, and in a worst case scenario, a mechanical failure or the like may occur. For this reason, the manufacturer may set an upper limit value and a lower limit value of the adjustable range in which the fine-adjustment value is adjustable by the user, in order to prevent the mechanical failure or the like.

The fine-adjustment data accepting part 52 of the main controller 110 stores the fine-adjustment value set by the operator in correspondence with the brand of transfer sheet. The fine-adjustment value in FIG. 9 is stored in the storage unit 132 in correspondence with the brand of transfer sheet in a manner added with respect to the set data group, however, the fine-adjustment data and the set data group may be stored separately.

In the example illustrated in FIG. 9, the image density adjustment is zero (0), the abnormal image quality improvement is −1, and the fixing strength adjustment is +1 for the "transfer sheet B of company CA".

When the fine-adjustment value for the image density adjustment is a positive value, the transfer controller 113 increases the bias voltage of the transfer unit depending on the fine-adjustment value. In addition, the developing controller 112 increases the bias voltage of the developing unit and the output intensity of the exposure unit depending on the fine-adjustment value. On the other hand, when the fine-adjustment value for the image density adjustment is a negative value, the control performed by the transfer controller 113 and the developing controller 112 is in reverse to that performed when the fine-adjustment value for the image density adjustment is the positive value.

When the fine-adjustment value for the abnormal image quality improvement is a positive value, the transfer controller 113 increases the secondary transfer reference current depending on the fine-adjustment value. On the other hand, when the fine-adjustment value for the abnormal image quality improvement is a negative value, the control performed by the transfer controller 113 is in reverse to that performed when the fine-adjustment value for the abnormal image quality improvement is the positive value.

When the fine-adjustment value for the fixing strength adjustment is a positive value, the fixing controller 114 increases the fixing unit temperature and increases the pressing force of the pressing roller on the heating roller, for example. On the other hand, when the fine-adjustment value for the fixing strength adjustment is a negative value, the control performed by the fixing controller 114 is in reverse to that performed when the fine-adjustment value for the fixing strength adjustment is the positive value.

Accordingly, although the fine-adjustment data and the set data groups do not necessarily correspond 1:1, the fine-adjustment data may adjust (that is, increase or decrease) all of the set data related to the fine-adjustment data. Consequently, the image forming apparatus 100 may perform the image formation by adding the fine-adjustment to the set data group that is determined by the expert institution.

For example, in a case in which toner image on the printed material output 120 that is printed by the image forming apparatus 100 based on the set data group has a low fusing characteristic and the toner is easily separated from the transfer sheet when the surface of the printed material output 120 is scraped or scratched, the operator may suitably adjust the fine-adjustment value of the fixing strength adjustment in order to improve the fusing characteristic by the fine-adjustment.

The transport controller 111, the developing controller 112, the transfer controller 113, and the fixing controller 114 may convert the set data and the fine-adjustment data related thereto into operation parameters for use in performing the image formation. In principle, the fine-adjustment data in this embodiment are stored in the storage unit 132 of the image forming apparatus 100, and are not sent to the server 200. In addition, the operator may modify the fine-adjustment data that is once set by the operator.

[Operating Procedure]

Figure 11:
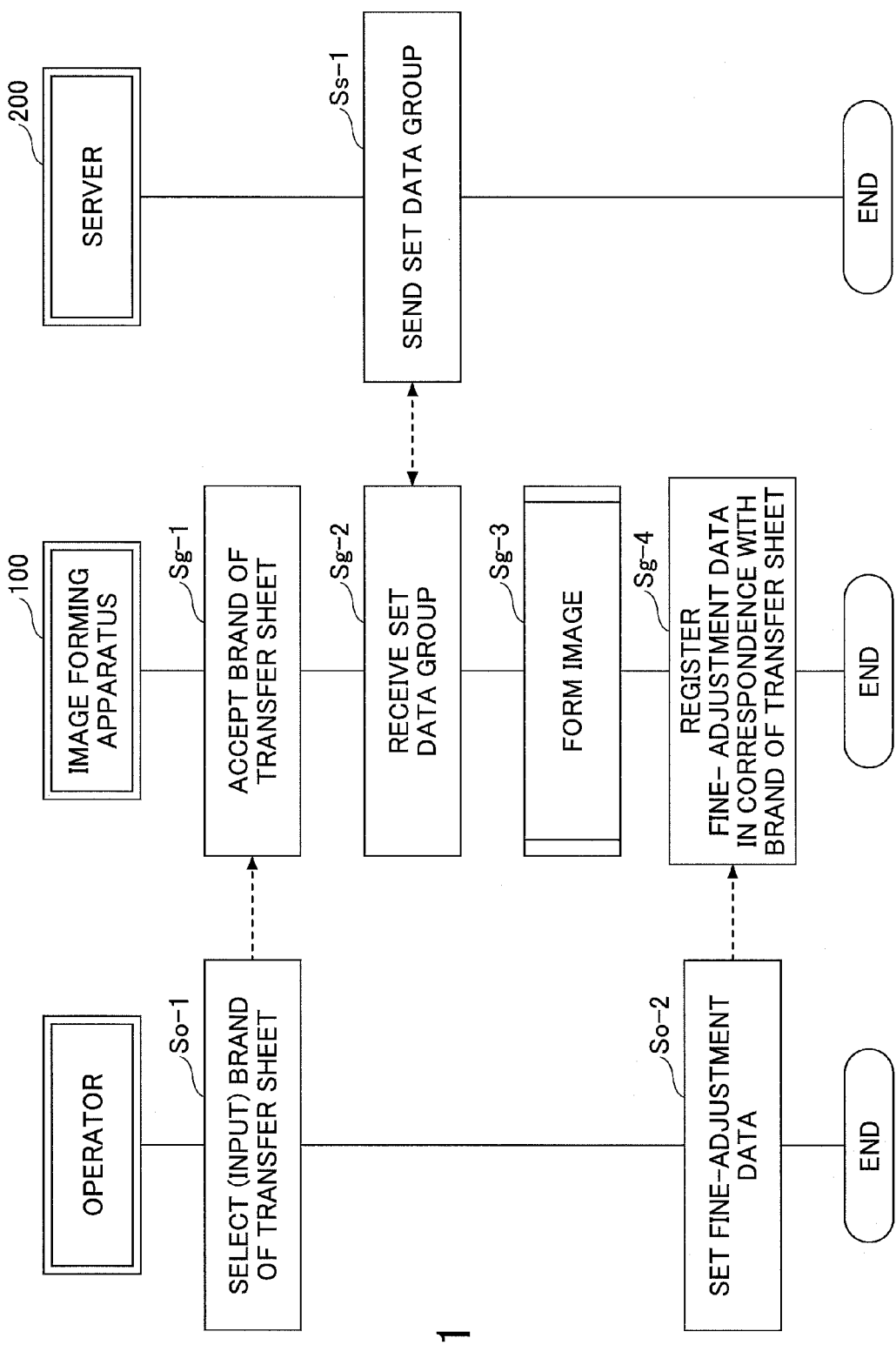
FIG. 11 is a flow chart for explaining an example of a procedure of the image forming apparatus for accepting registration of the fine-adjustment data from the operator.

FIG. 11 is a flow chart for explaining an example of a procedure of the image forming apparatus 100 for accepting registration of the fine-adjustment data from the operator.

First, in FIG. 11, the user prepares the transfer sheet and inputs the brand of transfer sheet (step So-1). The user may select the brand of transfer sheet from a list of brands of transfer sheets displayed on the operation panel 140 or, input the brand of transfer sheet by reading the bar code or the like printed on a package (or packing paper) of the transfer sheets by the image forming apparatus 100.

The set data group acquiring part 51 of the main controller 110 accepts the input of the brand of transfer sheet (step Sg-1). It is assumed for the sake of convenience that the set data group is not registered in the image forming apparatus 100, and that the main controller 110 sends the brand of transfer sheet and requests the set data group to the server 200.

In response to this request, the server 200 sends the set data group to the image forming apparatus 100 (step Ss-1). Hence, the image forming apparatus 100 receives the set data group (step Sg-2).

Thereafter, the operator operates the operation panel to perform the image formation using the set data group (step Sg-3). When the operator is unsatisfied with the image quality, the operator displays the screen illustrated in FIG. 10 on the operation panel 140 and inputs the fine-adjustment data (step So-2).

The fine-adjustment data accepting part 52 accepts the input of the fine-adjustment data, and stores the fine-adjustment data in correspondence with the brand of transfer sheet in the storage unit 132 (step Sg-4). Accordingly, the image forming apparatus 100 may register the fine-adjustment data for each brand of transfer sheet.

Figure 12:
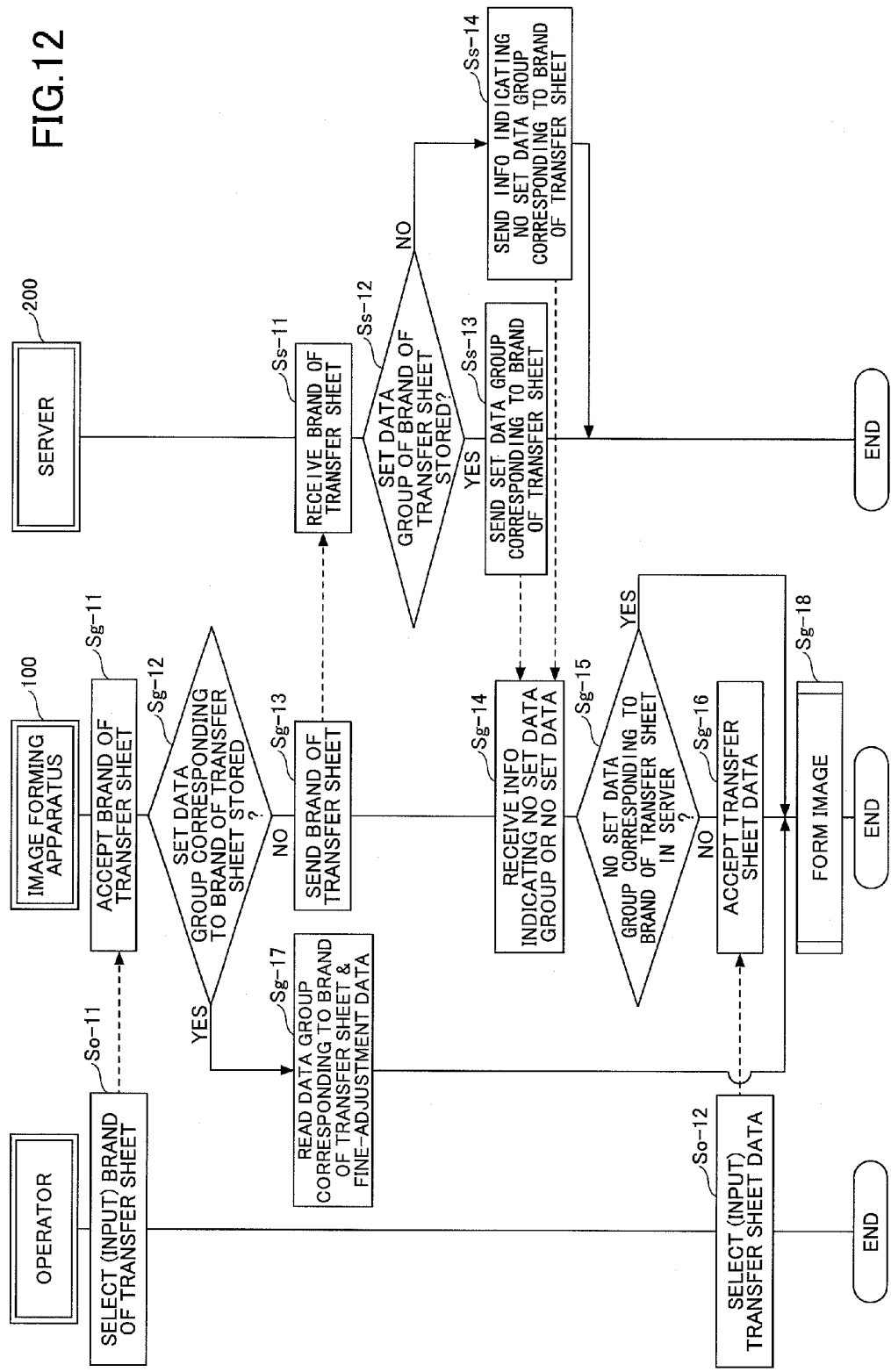
FIG. 12 is a flow chart for explaining an example of a procedure of the printing system for printing using the fine-adjustment data.

FIG. 12 is a flow chart for explaining an example of a procedure of the printing system 500 for printing using the fine-adjustment data.

First, in FIG. 12, the user prepares the transfer sheet and inputs the brand of transfer sheet (step So-11). The brand of transfer sheet may be input in the same manner as the step So-1 illustrated in FIG. 11 described above.

The set data group acquiring part 51 of the main controller 110 accepts the input of the brand of transfer sheet (step Sg-11). The set data group acquiring part 51 judges whether the input brand of transfer sheet is stored in the storage unit 132 (step Sg-12). The set data group of the brand of transfer sheet that has once been used, and the set data group of the brand of transfer sheet registered in the image forming apparatus 100 by the CE, may already be stored in the storage unit 132.

When the input brand of transfer sheet is registered in the list of set data groups (YES in step Sg-12), the main controller 110 reads the set data group corresponding to the brand of transfer sheet, and also reads the fine-adjustment data corresponding to the brand of transfer sheet if any (step Sg-17). In this case, the process advances to the image formation process (step Sg-18).

On the other hand, when the input brand of transfer sheet is not registered in the list of set data groups (NO in step Sg-12), the set data group acquiring part 51 of the main controller 110 sends the brand of transfer sheet to the server 200 (step Sg-13).

The server 200 receives the brand of transfer sheet from the image forming apparatus 100 (step Ss-11). Then, the server 200 judges whether the set data group of the brand of transfer sheet is stored therein (step Ss-12).

When the set data group of the brand of transfer sheet is stored in the server 200 (YES in step Ss-12), the server 200 sends the set data group to the image forming apparatus 100 (step Ss-13). On the other hand, when the set data group of the brand of transfer sheet is not stored in the server 200 (NO in step Ss-12), the server 200 sends to the image forming apparatus a notification (or message) indicating that the set data group is not stored in the server 200 (step Ss-14). In addition, the server 200 records the brand of transfer sheet that is judged as not being stored therein, and urges a person of the expert organization to urgently determine the set data group. The set data group acquiring part 51 of the image forming apparatus 100 receives from the server 200 the set data group or the notification indicating that the set data group is not stored in the server 200 (step Sg-14).

The set data group acquiring part 51 of the main controller 110 judges whether the set data group corresponding to the brand of transfer sheet is also not stored in the server 200, based on the received contents (step Sg-15). When the set data group is received from the server 200 (YES in step Sg-15), the main controller 110 starts the image formation using the set data group (step Sg-18). On the other hand, when the set data group is not received from the server 200 (NO in step Sg-15), the main controller 110 displays on the operation panel 140 a message indicating that no set data group exists, and urges the selection (or input) of the transfer sheet data in order to accept the transfer sheet data from the operator (step Sg-16).

The operator selects (or inputs) the transfer sheet data (step So-12). More particularly, the operator may operate the operation panel 140 and input the characteristics of the transfer sheet, such as the kind (or type), thickness, and size of the transfer sheet. Hence, the main controller 110 of the image forming apparatus 100 accepts the input of the transfer sheet data from the operator (step Sg-16). In addition, the main controller 110 specifies the brand of transfer sheet closest to the transfer sheet data that is input, from the transfer sheets stored in the list of set data group, and reads the set data group linked or associated to the specified brand of transfer sheet.

Because the transfer sheet data, such as the kind (or type), thickness, and size of the transfer sheet, are linked or associated to the brand of transfer sheet of the set data group, the main controller 110 may first extract the brand of transfer sheet identical to the brand of transfer sheet input by the operator, from the list of set data groups. Then, the main controller 110 may specify, from the extracted brand of transfer sheet, the transfer sheet of the kind and thickness closest to those of the transfer sheet input by the operator. Further, when a plurality of transfer sheets satisfy these conditions, the main controller 110 may specify the brand of transfer sheet having the size closest to that of the transfer sheet input by the operator. The set data group may be specified when the brand of transfer sheet can be specified in the above described manner.

After acquiring the set data group or, the set data group and the fine-adjustment data, the main controller 110 may perform the image formation (step Sg-18).

In other words, when only the set data group is acquired, the main controller 110 sets the secondary transfer reference current, the fixing unit temperature, and the linear velocity correction value and the like as operation parameters to the transport controller 111, the developing controller 112, the transfer control part 113, and the fixing controller 114.

On the other hand, when the set data group and the fine-adjustment data are acquired, the main controller 110 adjusts (that is, increases or decreases) each corresponding set data of the set data group based on the fine-adjustment data, and converts the adjusted set data into operation parameters that are set to the transport controller 111, the developing controller 112, the transfer control part 113, and the fixing controller 114.

When the main controller 110 requests the start of a control operation to each of the transport controller 111, the developing controller 112, the transfer control part 113, and the fixing controller 114, each of the transport controller 111, the developing controller 112, the transfer control part 113, and the fixing controller 114 performs the control operation depending on the operation parameters in order to form the image on the transfer sheet.

As described above, even when the user in the printing system 500 of this embodiment is unsatisfied with the set data group, the user may adjust the set data group by the fine-adjustment data. Hence, the printing may be performed at an optimum condition with respect to each kind of transfer sheet which may increase even on a day to day basis. In addition, because the user may individually manage the fine-adjustment data, the load of managing the fine-adjustment data in the server 200 may be avoided.

[Second Embodiment]

One fine-adjustment data may be made to correspond to one brand of transfer sheet in the printing system 500 of the first embodiment described above. However, the user may wish to set the optimum fine-adjustment data while varying the fine-adjustment data for one brand of transfer sheet. In such a case, it may be useful to make a plurality of different fine-adjustment data correspond to one set data group. In addition, when it is desirable to apply the fine-adjustment data to an image forming apparatus other than the image forming apparatus 100, it may be useful to store a pair (or set) of set data group and fine-adjustment data in an external storage unit which may be carried by the user or the like.

Hence, a plurality of different fine-adjustment data are made to correspond to one set data group in the printing system 500 of a second embodiment of the present invention, as will be described hereunder.

FIG. 13 is a diagram illustrating an example of a screen from which the operator makes the fine-adjustment of the image quality. In FIG. 13, those parts that are the same as those corresponding parts in FIG. 10 are designated by the same reference numerals, and a description thereof will be omitted. The screen illustrated in FIG. 13 additionally includes a brand of transfer sheet field 304 into which the operator may input the brand of transfer sheet.

A name to enable identification of the pair of set data group and fine-adjustment data by the operator may be input to the brand of transfer sheet field 304 of the screen illustrated in FIG. 13. This name will hereinafter also be referred to as the "user set transfer sheet brand". The user set transfer sheet brand is individually assigned by the user, and any name may be used as long as it is possible to recognize the set data group of the transfer sheet from which the user generated the name. Preferably, however, the name includes the brand of transfer sheet registered in the set data group. In the example illustrated in FIG. 13, a user set transfer sheet brand "Transfer sheet A of company CA, user setting 1" is input to the brand of transfer sheet field 304 so that it is possible to recognize therefrom that the set data group of "Transfer sheet A of company CA" has been finely adjusted.

When the user pushes a submit button on the screen illustrated in FIG. 13, the fine-adjustment data accepting part 52 adds a new record to the set data groups and the fine-adjustment data stored in the storage unit 132, in order to register the user set transfer sheet brand input to the brand of transfer sheet field 304 as the brand of transfer sheet.

FIG. 14 is a diagram illustrating an example of the set data and the fine-adjustment data in the second embodiment. As illustrated in FIG. 14, the "Transfer sheet A of company Ca, user setting 1" is registered in the brand of transfer sheet. In addition, because the set data group of the pair of set data group and fine-adjustment data is the set data group of "Transfer sheet A of company CA", the fine-adjustment data accepting part 52 copies the set data group of "Transfer sheet A of company CA" to the record of the "Transfer sheet A of company CA, user setting 1". Further, the fine-adjustment data accepting part 52 registers the fine-adjustment data set by the user from the screen illustrated in FIG. 13 to the field of the fine-adjustment data in the record of "Transfer sheet A of company CA, user setting 1".

Accordingly, because the operator may freely assign a name to the pair of set data group and fine-adjustment data, a plurality of fine-adjustment data may be stored in correspondence with one set data group that is acquired from the server 20 by the image forming apparatus 100. The user set transfer sheet data includes the user set transfer sheet brand, the copied set data group, and the fine-adjustment data of one record.

When the operator assigns the user set transfer sheet brand to the pair of set data group and fine-adjustment data, the user set transfer sheet data sending part 53 sends the user set transfer sheet data to the server 200.

If the user setting transfer sheet data sending part 53 were to send only the fine-adjustment data to the server 200, the server 200 would need to manage the correspondence between the brand of transfer sheet and the fine-adjustment data. In this case, in order to enable selection of the desired pair of set data group and fine-adjustment data even when the plurality of fine-adjustment data are made to correspond to one brand of transfer sheet, a new brand of transfer sheet identifiable by the user would need to be assigned to the pair of the brand of transfer sheet and each of the plurality of fine-adjustment data.

On the other hand, according to this embodiment, the user set transfer sheet brand is already assigned by the operator with respect to the pair of set data group and fine-adjustment data, and thus, the server 200 may store the user set transfer sheet data as it is. Because a different user may assign the same user set transfer sheet brand to the pair of set data group and fine-adjustment data, the server preferably registers the identification information of the image forming apparatus 100 together with the user set transfer sheet brand, the set data group, and the fine-adjustment data.

The user set transfer sheet data that is once registered in the server 200 may be specified by the server 200 and sent to the image forming apparatus 100 when the operator specifies the user set transfer sheet brand. Hence, the user may utilize the user set transfer sheet data in the same manner as the set data group determined by the expert institution. The identification information (for example, IP (Internet Protocol) address) of the image forming apparatus 100 is sent to the server 200 without the operator being aware of this, and for this reason, the server 200 may identify or specify the image forming apparatus 100 that sent the user set transfer sheet data.

In addition, the operator may operate the operation panel 140 and copy the user set transfer sheet data stored in the storage unit 132 into the external storage medium 134. The operator may also store the user set transfer sheet data in the PC 300 and the like. When the operator wishes to perform the printing using the same fine-adjustment data in a plurality of image forming apparatuses 100, the fine-adjustment data may be read from the external storage medium 134 at each of the plurality of image forming apparatuses 100. In this case, the printing may be performed using the same fine-adjustment data by the plurality of image forming apparatuses 100 of the user, and the image quality may easily be unified for the user (within a company, for example).

According to the printing system 500 of this embodiment, the operator may assign the user set transfer sheet brand to the pair of set data group and fine-adjustment data. Hence, a plurality of fine-adjustment data may be made to correspond to one set data group. In addition, the server 200 may manage the plurality of fine-adjustment data in correspondence with one set data group, without modifying the original set data group, and the user may perform the printing by downloading the user set transfer sheet data. Since each user may assign the user set transfer sheet brand to the pair of set data group and fine-adjustment data and manage the user set transfer sheet band, the load on the server 200 is prevented from increasing considerably even when the user set transfer sheet data is stored in the server 200.

[Third Embodiment]

The generation of the fine-adjustment data is described with reference to the first and second embodiments. Next, the management of the image forming apparatus 100 using the fine-adjustment data will be described with reference to a third embodiment of the present invention.

Figure 15:
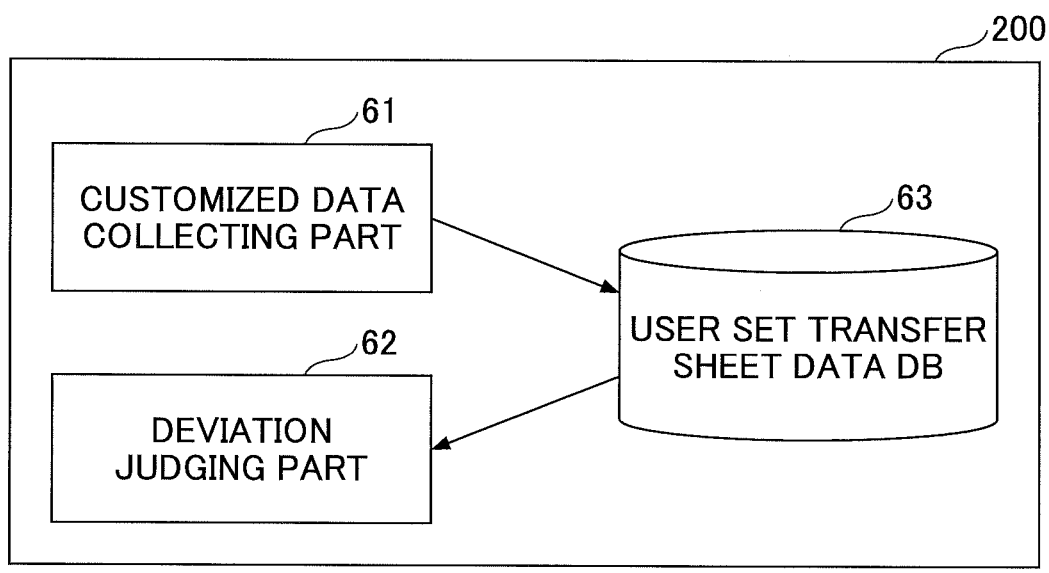
FIG. 15 is a functional block diagram illustrating an example of the server.

FIG. 15 is a functional block diagram illustrating an example of the server in this embodiment. A server 200 illustrated in FIG. 15 includes a customized data collecting part 61, a deviation judging part 62, and a user set transfer sheet data DB (Data-Base) 63. The functions of the customized data collecting part 61 and the deviation judging part 62 may be realized by executing one or more programs 210 by the CPU 201 of the server 200. The user set transfer sheet data DB 63 may be implemented in the HDD 204, for example.

As described above in conjunction with the second embodiment, the image forming apparatus 100 sends the user set transfer sheet data to the server 200. The customized data collecting part 61 of the server 200 receives the user set transfer sheet data that is periodically sent from the image forming apparatus 100, for example, and stores the user set transfer sheet data in the user set transfer sheet data DB 63 in correspondence with the identification information of the image forming apparatus 100. In this embodiment, the image forming apparatus 100 sends to the server 200 the identification information thereof, such as a serial number, a product number, or the like of the image forming apparatus 100 stored in the storage unit 132, so that the server 200 may identify the image forming apparatus 100 at the sending source.

Hence, the server 200 may collect information illustrated in FIG. 16, for example. FIG. 16 is a diagram illustrating an example of the information collected by the server 200. The information illustrated in FIG. 16 includes, in correspondence with the identification information of the image forming apparatus 100, the user set transfer sheet brand, the brand of transfer sheet, and the fine-adjustment data. The link or association of the user set transfer sheet brand and the brand of transfer sheet may be difficult in the server 200. Hence, when registering the brand of transfer sheet in the information illustrated in FIG. 16, the image forming apparatus 100 may send to the server 200 the brand of transfer sheet at the copy source of the set data group.

The fine-adjustment data is useful in collecting the characteristics of each transfer sheet, the preference or taste of the user, and the state of the image forming apparatus 100. An absolute value of the fine-adjustment data may represent the deviation from the set data group. Thus, assuming that the image forming apparatus 100 is operating in a normal manner, the fine-adjustment data having a large amount of deviation may indicate that the transfer sheet is special, for example. In addition, when it is uncertain whether the image forming apparatus 100 is operating in a normal manner, the large amount of deviation may indicate that the serviceable life of the image forming apparatus 100 is about to end or a failure is about to occur in the image forming apparatus 100.

Therefore, the fine-adjustment data is useful information to the CE who performs maintenance of the image forming apparatus 100. When the CE detects the image forming apparatus 100 with the fine-adjustment data having a large amount of deviation, the CE may visit the user of the image forming apparatus 100 and inspect whether indications of an abnormality exist in the image forming apparatus 100. If no indications of an abnormality exist in the image forming apparatus 100, the CE may use the fine-adjustment data of the image forming apparatus 100 as a reference when determining the set data group in the future.

The deviation judging part 62 of the server 200 may read the fine-adjustment data and judge whether the CE should visit the user of the image forming apparatus 100 when the amount of deviation is large. For example, the deviation judging part 62 may obtain an absolute value of each item of the fine-adjustment data, and read the identification information of the image forming apparatus 100 and notify the CE when the absolute value of at least one item of the fine-adjustment data is greater than a threshold value. The method of notifying the CE is not limited to a particular method. For example, the identification information of the image forming apparatus 100 and the user set transfer sheet data may be sent by an e-mail address to a mail address of the CE.

It may be effective to compare the fine-adjustment data for the same brand of transfer sheet. For example, with respect to the transfer sheet A of company CA, the fine-adjustment data having a relatively large absolute value may be registered in a plurality of image forming apparatuses 100. On the other hand, the fine-adjustment data having a relatively small absolute value may be registered in a certain image forming apparatus 100. In such a case, the certain image forming apparatus 100 may have indications of an abnormality. For example, the deviation judging part 62 may calculate an average for each item of the fine-adjustment data of the same brand of transfer sheet, and calculate a standard deviation of the fine-adjustment values of each of a plurality of image forming apparatuses 100. The image forming apparatus 100 having a relatively large standard deviation may have indications of an abnormality.

In the information illustrated in FIG. 16, for example, the abnormal image quality improvement is "+5" for the image forming apparatus 100 having the identification information "0002". In this example, the deviation judging part 62 reads and notifies the identification information "0002" of the image forming apparatus 100 to the CE. As a result, it may be possible to infer that the image forming apparatus 100 having the identification information "0002" is in a state in which the abnormal image quality is likely to occur in the printed material output 120, and instruct the CE to visit the user of this image forming apparatus 100 for maintenance, for example.

Figure 17:
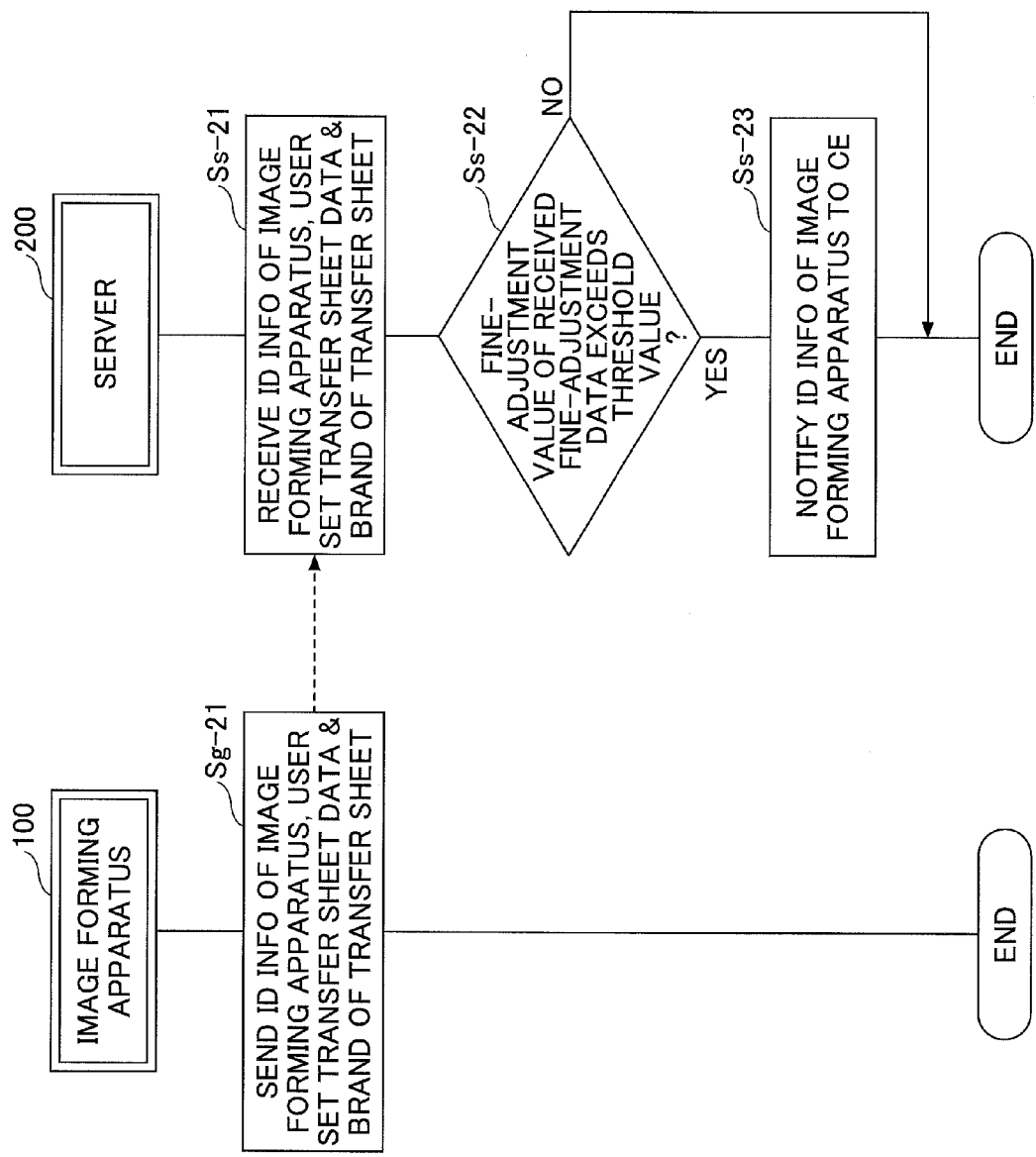
FIG. 17 is a flow chart for explaining an example of a procedure of the server for specifying the image forming apparatus having indications of an abnormality.

FIG. 17 is a flow chart for explaining an example of a procedure of the server 200 for specifying the image forming apparatus 100 having indications of an abnormality. The procedure illustrated in FIG. 17 is started when the fine-adjustment data is newly registered in the image forming apparatus 100 or, when the fine-adjustment data is periodically sent from the image forming apparatus 100 to the server 200.

First, the user set transfer sheet data sending part 53 of the image forming apparatus 100 sends the identification information of this image forming apparatus 100, the user set transfer sheet data, and the brand of transfer sheet at the copy source to the server 200 (step Sg-21).

The customized data collecting part 61 of the server 200 receives the identification information of the image forming apparatus 100, the user set transfer sheet data, and the brand of transfer sheet at the copy source, from the image forming apparatus 100 (step Ss-21). In addition, the customized data collecting part 61 stores the user set transfer sheet data, the brand of transfer sheet, and the fine-adjustment data in the user set transfer sheet data DB 63, in correspondence with the identification information of the image forming apparatus 100.

The deviation judging part 62 reads the user set transfer sheet data, and judges whether the fine-adjustment value of the fine-adjustment data exceeds a threshold value for each fine-adjustment item (step Ss-22). When the fine-adjustment value of the fine-adjustment data does not exceed the threshold value (NO in step Ss-22), the deviation judging part 62 reads the next user set transfer sheet data. On the other hand, when the fine-adjustment value of the fine-adjustment data exceeds the threshold value (YES in step Ss-22), the deviation judging part 62 notifies the identification information of the corresponding image forming apparatus 100 to the CE (step Ss-23).

Accordingly, in the printing system 500 of this embodiment, the indications of an abnormality in the image forming apparatus 100 may be detected at an early stage, and the use of a special transfer sheet may also be detected, by monitoring the fine-adjustment data.

Further, the present invention is not limited to these embodiments, but various variations and modifications may be made without departing from the scope of the present invention.

What is claimed is:

1. An image forming apparatus comprising:
   an identification information accepting unit configured to accept input of transfer sheet identification information;
   an image forming unit configured to form an image on a transfer sheet based on a control value corresponding to the transfer sheet identification information accepted by the identification information accepting unit; and
   a correction value accepting unit configured to accept input of an adjustable correction value of the control value, and store the correction value in correspondence with the transfer sheet identification information in a storage unit,
   wherein the image forming unit forms the image on the transfer sheet based on the control value that is corrected by the correction value when the control value is stored in correspondence with the transfer sheet identification information accepted by the identification information accepting unit,
   wherein the storage unit stores set data groups in which the control value is registered in correspondence with the transfer sheet identification information,
   wherein the storage unit further stores finely adjustable items of the correction value in correspondence with the user set transfer sheet identification information, and
   wherein the finely adjustable items include an image density adjustment, an abnormal image quality improvement, a fixing strength adjustment, and registration adjustments.

2. The image forming apparatus as claimed in claim 1, wherein the correction value accepting unit accepts input of user set transfer sheet identification information, as the transfer sheet identification information, together with input of the correction value of the control value, and copies the control value corresponding to the transfer sheet identification information accepted by the identification information accepting unit and stores the copied control value and the correction value in the storage unit in correspondence with the user set transfer sheet identification information.

3. The image forming apparatus as claimed in claim 2, further comprising:
an access unit configured to store the correction value and the control value stored in correspondence with the user set transfer sheet identification information in the storage unit,
wherein the storage unit is coupled externally to the image forming apparatus.

4. The image forming apparatus as claimed in claim 1, further comprising:
a set data group acquiring unit configured to acquire the set data group from an external information processing apparatus by sending thereto the transfer sheet identification information accepted by the identification information accepting unit.

5. The image forming apparatus as claimed in claim 4, further comprising:
a data sending unit configured to send to the external information processing apparatus the correction value stored in correspondence with the user set transfer sheet identification information, the control value, and identification information of the image forming apparatus,
wherein the set data group acquiring unit acquires the correction value and the control value from the external information processing apparatus by specifying the user set transfer sheet identification information and the identification information of the image forming apparatus.

6. The image forming apparatus as claimed in claim 3, wherein the image forming unit forms the image based on the control value that is corrected by the correction value read from the storage unit by the access unit.

7. The image forming apparatus as claimed in claim 4, wherein the image forming unit forms the image based on the control value that is corrected by the correction value read from the storage unit by the access unit, and wherein the storage unit is coupled externally to the image forming apparatus.

8. A printing system comprising:
an information processing apparatus; and
an image forming apparatus communicable with the information processing apparatus via a network,
wherein the image forming apparatus comprises:
an identification information accepting unit configured to accept input of transfer sheet identification information;
an image forming unit configured to form an image on a transfer sheet based on a control value corresponding to the transfer sheet identification information accepted by the identification information accepting unit; and
a correction value accepting unit configured to accept input of an adjustable correction value of the control value, and store the correction value in correspondence with the transfer sheet identification information in a storage unit,
wherein the image forming unit forms the image on the transfer sheet based on the control value that is corrected by the correction value when the control value is stored in correspondence with the transfer sheet identification information accepted by the identification information accepting unit,
wherein the storage unit stores set data groups in which the control value is registered in correspondence with the transfer sheet identification information,
wherein the storage unit further stores finely adjustable items of the correction value in correspondence with the transfer sheet identification information, and
wherein the finely adjustable items include an image density adjustment, an abnormal image quality improvement, a fixing strength adjustment, and registration adjustments.

9. The printing system as claimed in claim 8 wherein the information processing apparatus comprises:
a user set transfer sheet data storing unit configured to store user set transfer sheet data formed by a combination of the transfer sheet identification information, the correction value, the control value, and identification information of the image forming apparatus,
wherein the user set transfer sheet data is sent to the image forming apparatus.

10. The printing system as claimed in claim 8, wherein the correction value accepting unit accepts input of user set transfer sheet identification information, as the transfer sheet identification information, together with input of the correction value of the control value, and copies the control value corresponding to the transfer sheet identification information accepted by the identification information accepting unit and stores the copied control value and the correction value in the storage unit in correspondence with the user set transfer sheet identification information.

11. The printing system as claimed in claim 9, wherein the information processing apparatus comprises:
a data collecting unit configured to collect and store the correction value, the control value, and the identification information of the image forming apparatus stored in correspondence with the transfer sheet identification information in the user set transfer sheet data storing unit; and
an abnormality detecting unit configured to detect indications of an abnormality in the image forming apparatus based on the control value.

12. A non-transitory computer-readable storage medium that stores a program which, when executed by a computer, causes the computer to perform a process comprising:
an identification information accepting procedure causing the computer to accept input of transfer sheet identification information;
an image forming procedure causing the computer to form an image on a transfer sheet based on a control value corresponding to the transfer sheet identification information accepted by the identification information accepting unit;
a correction value accepting procedure causing the computer to accept input of an adjustable correction value of the control value, and store the correction value in correspondence with the transfer sheet identification information in a storage unit,
wherein the image forming procedure causes the computer to form the image on the transfer sheet based on the control value that is corrected by the correction value when the control value is stored in correspondence with the transfer sheet identification information accepted by the identification information accepting procedure,
wherein the correction value accepting procedure causes the computer to accept input of user set transfer sheet identification information, as the transfer sheet identification information, together with input of the correction value of the control value, and copy the control value corresponding to the transfer sheet identification information accepted by the identification information accepting procedure and store the copied control value and the correction value in the storage unit in correspondence with the user set transfer sheet identification information;

an access procedure causing the computer to store the correction value and the control value stored in correspondence with the user set transfer sheet identification information in the storage unit, wherein the storage unit is coupled externally to the computer, wherein the access procedure causes the computer to further store finely adjustable items of the correction value in correspondence with the transfer sheet identification information in the storage unit, and wherein the finely adjustable items include an image density adjustment, an abnormal image quality improvement, a fixing strength adjustment, and registration adjustments.

13. The non-transitory computer-readable storage medium as claimed in claim 12, wherein the process further comprises:

a set data group acquiring procedure causing the computer to acquire the set data group from an external information processing apparatus by sending thereto the transfer sheet identification information accepted by the identification information accepting procedure.

14. The non-transitory computer-readable storage medium as claimed in claim 13, wherein the process further comprises:

a data sending procedure causing the computer to send to the external information processing apparatus the correction value stored in correspondence with the user set transfer sheet identification information, the control value, and identification information of the computer, wherein the set data group acquiring procedure causes the computer to acquire the correction value and the control value from the external information processing apparatus by specifying the user set transfer sheet identification information and the identification information of the computer.

15. The non-transitory computer-readable storage medium as claimed in claim 12, wherein the image forming procedure causes the computer to form the image based on the control value that is corrected by the correction value read from the storage unit by the access procedure.

16. The non-transitory computer-readable storage medium as claimed in claim 14, wherein the image forming procedure causes the computer to form the image based on the control value that is corrected by the correction value read from the storage unit by the access procedure, and wherein the storage unit is coupled externally to the computer.

* * * * *